US012624163B2

(12) United States Patent
Dishari

(10) Patent No.: US 12,624,163 B2
(45) Date of Patent: May 12, 2026

(54) IONOMERS WITH MACROCYCLIC MOIETIES FOR ION CONDUCTIVITY AND PERMSELECTIVITY

(71) Applicant: NUtech Ventures, Lincoln, NE (US)

(72) Inventor: Shudipto Konika Dishari, Dacca (BD)

(73) Assignee: NUtech Ventures, Lincoln, NE (US)

( * ) Notice: Subject to any disclaimer, the term of this patent is extended or adjusted under 35 U.S.C. 154(b) by 829 days.

(21) Appl. No.: 17/996,666

(22) PCT Filed: Apr. 20, 2021

(86) PCT No.: PCT/US2021/070432
§ 371 (c)(1),
(2) Date: Oct. 20, 2022

(87) PCT Pub. No.: WO2021/217175
PCT Pub. Date: Oct. 28, 2021

(65) Prior Publication Data
US 2023/0220158 A1 Jul. 13, 2023

Related U.S. Application Data

(60) Provisional application No. 63/012,462, filed on Apr. 20, 2020.

(51) Int. Cl.
*C08G 65/334* (2006.01)
*H01M 8/1027* (2016.01)
(Continued)

(52) U.S. Cl.
CPC ...... *C08G 65/3346* (2013.01); *H01M 8/1027* (2013.01); *H01M 8/1032* (2013.01); *H01M 10/0565* (2013.01)

(58) Field of Classification Search
CPC ....... C08L 5/16; H01M 4/622; H01M 8/1032; C08G 65/26
See application file for complete search history.

(56) References Cited

U.S. PATENT DOCUMENTS

| | | | |
|---|---|---|---|
| 2013/0183582 A1 | 7/2013 | Halalay et al. | |
| 2018/0217087 A1 | 8/2018 | Swain et al. | |
| 2019/0051904 A1 | 2/2019 | Zhamu et al. | |

FOREIGN PATENT DOCUMENTS

| | | | |
|---|---|---|---|
| CN | 105348303 A * | 2/2016 | ........... C07D 487/22 |
| WO | 2010003224 | 1/2010 | |

OTHER PUBLICATIONS

Machine-generated English language translation of Description of CN 105348303A, published Feb. 24, 2016, 14 pages, retrieved from Espacenet on Aug. 30, 2025. (Year: 2016).*

(Continued)

*Primary Examiner* — Fred M Teskin
(74) *Attorney, Agent, or Firm* — Womble Bond Dickinson (US) LLP

(57) ABSTRACT

Provided here are ion conducting materials including one or more macrocycles, and either one or more pendant groups or one or more backbone repeat units. The ion conducting materials exhibit distinctly high ion conductivity in thin film and bulk membrane applications, and further exhibit one or more of ion permselectivity, mechanical strength, self-assembly, stacking, and gating behavior. Further provided are methods for preparation and methods for use of the ion conducting materials.

20 Claims, 14 Drawing Sheets calix-1a calix-2

PS-calix-1 bpF-calix-1

(51) Int. Cl.
*H01M 8/1032* (2016.01)
*H01M 10/0565* (2010.01)

(56) References Cited

OTHER PUBLICATIONS

International Search Report and Written Opinion for International Application No. PCT/US2021/070432, Aug. 24, 2021.
Dondoni et al., Synthesis and characterization of bisphenol-A copolyethers and copolyesters carrying calix[4]arene units in the main chains and their binding properties towards silver cations. Macromolecular Chemistry and Physics. 1999, vol. 200, pp. 77-86.

* cited by examiner

Calix[n]arenes

Cyclodextrins

Dibenzo-x-crown-y
(Crown ethers)

Porphyrins

R= aliphatic/aromatic unit n=1 to 10 n=1 to 10
R= aliphatic/aromatic unit n=1 to 10 calix-1a

PS-calix-1 calix-2 bpF-calix-1 crown-6-based ionomer crown-8-based ionomer crown-12-based ionomer

HPTS
(Protonated state)

HPTS
(Deprotonated state)

IONOMERS WITH MACROCYCLIC MOIETIES FOR ION CONDUCTIVITY AND PERMSELECTIVITY

CROSS-REFERENCE TO RELATED APPLICATION

This application is a National Stage Entry of PCT Application of PCT/US2021/070432, filed on Apr. 20, 2021, titled "IONOMERS WITH MACROCYCLIC MOIETIES FOR ION CONDUCTIVITY AND PERMSELECTIVITY," which claims the benefit of and priority to U.S. Provisional Application No. 63/012,462, filed on Apr. 20, 2020, titled "IONOMERS WITH MACROCYCLIC MOIETIES FOR ION CONDUCTIVITY AND PERMSELECTIVITY," which is incorporated by reference herein in its entirety.

STATEMENT REGARDING FEDERALLY SPONSORED RESEARCH OR DEVELOPMENT

This invention was made with government support under 1750040 and under 1557417 awarded by the National Science Foundation and under DE-SC0020336 awarded by the U.S. Department of Energy. The government has certain rights in the invention.

TECHNICAL FIELD

The present disclosure relates to ion conducting materials and their use in energy conversion and storage devices such as fuel cells and batteries.

BACKGROUND

To minimize the global carbon footprint, development of low-cost, eco-friendly electric cars and appliances are critical. However, the advancement of clean energy technologies relies on overcoming significant scientific challenges, including the development of next generation materials with improved performance and durability for use in energy conversion and storage devices such as fuel cells, batteries, electrolyzers, and supercapacitors. Electrochemistry is the core principle of all these energy conversion and storage devices, and ion conduction plays a critical role on the efficiency of these technologies.

Proton exchange membrane fuel cell (PEMFC) is one such energy conversion device which requires proton conduction from anode to cathode, and can power not only the electric cars, but also unmanned vehicles, and many portable/stationary applications. PEMFC is eco-friendly as it does not produce any toxic or greenhouse gases (such as CO and $CO_2$) while producing electricity, producing only water during oxygen reduction reaction at the cathode. However, one of the fundamental scientific and engineering challenges of fuel cells (including PEMFCs), electrolyzers, and many other energy technologies is the interfacial ion transport/conduction limitation. Such technologies require ion conducting polymers (or ionomers) in two different formats: (i) a bulk ion conducting polymer (several tens of micron thick) separating anode and cathode as well as preferentially transporting a specific type of cation or anion from one electrode compartment to another; and (ii) a sub-micron thickness (~2-30 nm for Pt based catalysts) ionomer layer binding catalyst particles on the electrodes. This thin ionomer-based catalyst-binder layer is also expected to promote proton conduction to the catalyst interfaces. However, this nanoscale-thick film behaves very differently from a bulk membrane. In the nano-thin films, the entrapment of ionomer chains and water molecules (known as spatial confinement) as well as complex multimodal interfacial interactions among water, ionomer, and substrate impact the glass transition temperature ($T_g$) and often make water transport and ion conduction difficult.

While the current state-of-the-art fluorocarbon-based and hydrocarbon-based ionomers conduct protons in bulk membrane efficiently, proton conduction through the thin films of the same ionomers is very poor. In sub-micron thick films of the current state-of-the-art ionomers (such as Nafion), the ionomer chains experience kinetic trapping and confinement. The phase mixing (rather than spontaneous phase segregation, needed for ion conduction) as well as small (~1-2 nm in diameter), scattered, ill-connected ionic domains cannot conduct ions efficiently in thin films. Studies on Nafion, the current state-of-the-art fluorocarbon-based ionomer used for fuel cells, have shown that the activation energy of proton conduction in Nafion thin film is significantly higher than bulk Nafion membrane and the proton conductivity of thinner Nafion film is lower than bulk Nafion membrane. Nafion shows high proton conductivity (~50-100 mS/cm) in bulk membrane (25-50 mm thick) format where the hydrophilic-hydrophobic phase separation leads to ionic domains with size ~4 nm. The same ionomer, when spin-coated into several tens of nm thick films, forms ionic domains with narrower diameter. The number of proton conductive pathways and the connectivity of proton conducting domains decrease as the film thickness decreases. This resistance to ion conduction at ionomer binder-catalyst interfaces leads to sluggish electrochemical reaction (oxygen reduction reaction; ORR) kinetics and negatively impacts the power density and energy efficiency of energy conversion devices, such as PEMFCs. Ion conductivity of hydrocarbon-based ionomers are also very low in thin film (<1 μm) format due to high ion transport resistance as well as high phase mixing and narrow ion channels (in many cases). Accordingly, there is a need for ionomers with efficient ion conduction in both bulk and thin film forms.

In addition to high ion conductivity, the other major performance criterion for energy conversion and storage devices (such as redox flow batteries with great promise for large-scale energy storage technologies) is ion permselectivity. In such devices, it is often necessary to selectively transport smaller ions (e.g., protons ($H^+$)) while inhibiting the transport of redox active species (e.g., vanadium ions in vanadium redox flow batteries) or other larger ions. By effectively minimizing the crossover of undesired larger ionic redox species (e.g., vanadium ions) through the ionomeric membrane separator (placed between electrode compartments) while maintaining proton conduction, the loss of capacity and coulombic efficiency of the redox flow battery can be reduced. Minimizing methanol fuel crossover, while maintaining very high proton conductivity, can help to improve power density of the direct methanol fuel cells.

There have been multiple approaches to impart ion selectivity, such as (i) the use of hydrocarbon-based ionomers with dense structure and low porosity (such as nanofiltration membranes with pore radius~1 nm); (ii) surface modification; (iii) layering; (iv) incorporation of organic (often cross-linkable)/inorganic nanoparticles; and (vi) polymerization of monomers within pores to narrow down the pores. While pore sizes of 1 nm are easy to generate, those are not very effective to offer permselectivity in artificial membranes. For example, Nafion membranes offer large ionic domains of 4 nm diameter which are too big to prevent methanol fuel crossover in direct methanol fuel cells or vanadium ions crossover in redox flow batteries. Pore size needs to be on the order of 3-4 Å to completely reject certain salts, molecules, and ions; however, achieving such small pores is often challenging. In addition, achieving high ion conductivity and permselectivity simultaneously is particularly challenging, as impediments to ion conduction pathways for obtaining selectivity ultimately lower total ion conductivity. Currently, none of the existing strategies for achieving permselectivity offer molecular level precision in controlling pore size. Accordingly, there is a need for ionomers with high conductivity in both bulk and thin film forms, while simultaneously offering appropriate selectivity for each indication. Apart from energy conversion and storage technologies, such ionomers may have versatile applications in energy efficient water purification (membrane desalination, nanofiltration, ultrafiltration for water treatment), bioseparation, pharmaceutical and environmental applications.

SUMMARY

The present disclosure generally provides ion conducting materials including a macrocyclic unit and various pendant groups or backbone repeat units. Surprisingly, according to the present disclosure, it has been found that certain combinations of such macrocyclic units, pendant groups, and backbone repeat units provide materials which exhibit favorable ion conductivity, even in thin film (<1 μm thick) applications. In addition, these materials exhibit one or more of ion permselectivity, mechanical strength, self-assembly, stacking, and gating behavior.

Accordingly, in one aspect, the disclosure provides an ion conducting material containing: one or more types of macrocyclic repeat units, the macrocyclic repeat units including a macrocycle which is a calix[n]arene where n is an integer of from about 4 to about 20, a crown ether, a cyclodextrin, or a porphyrin; and a pendant group and/or one or more types of backbone repeat units, wherein the pendant group or the backbone repeat units are chemically bonded to the macrocycle.

In some embodiments, the ion conducting material contains a macrocycle which is a calix[n]arene where n is an integer from about 4 to about 20. In some embodiments, n is 4.

In some embodiments, the ion conducting material contains a macrocycle which is a dibenzo-x-crown-y ether, wherein x is a multiple of 3 from 12 to 81; and y is x/3. In some embodiments, the dibenzo-x-crown-y ether is one or more of dibenzo-18-crown-6, dibenzo-24-crown-8, and dibenzo-36-crown-12.

In some embodiments, the ion conducting material contains a macrocycle which is a cyclodextrin. In some embodiments, the cyclodextrin is one or more of α-cyclodextrin, β-cyclodextrin, and γ-cyclodextrin.

In some embodiments, the ion conducting material includes a macrocycle which is a porphyrin.

In some embodiments, the pendant group includes an aliphatic group, an aromatic group, or a combination thereof.

In some embodiments, the aliphatic group is alkyl, alkenyl, alkynyl, cycloalkyl, or heterocyclyl, each of which may optionally be substituted with one or more of alkyl, alkenyl, alkynyl, cycloalkyl, heterocycloalkyl, alkaryl, alkyl heteroaryl, amino, ammonium, acyl, acyloxy, acylamino, aminocarbonyl, alkoxycarbonyl, ureido, carbamate, aryl, heteroaryl, sulfinyl, sulfonyl, hydroxyl, alkoxy, sulfanyl, halo, carboxy, trihalomethyl, cyano, hydroxy, mercapto, or nitro. In some embodiments, the aliphatic group is alkyl, perfluoroalkyl, or alkyl ether.

In some embodiments, the aromatic group can be aryl, heteroaryl, or aralkyl, each of which may optionally be substituted with one or more of alkyl, alkenyl, alkynyl, cycloalkyl, heterocycloalkyl, amino, ammonium, acyl, acyloxy, acylamino, aminocarbonyl, alkoxycarbonyl, ureido, carbamate, sulfinyl, sulfonyl, hydroxyl, alkoxy, sulfanyl, halo, carboxy, trihalomethyl, cyano, hydroxy, mercapto, or nitro. In some embodiments, the aromatic group can be phenyl, biphenyl, triphenyl, naphthyl, or anthracenyl units. In some embodiments, the aromatic group can be a bisphenol, a bi- or triphenyl, a sulfone, an ether sulfone, an ether ketone, an ether ketone, or a fluorene.

In some embodiments, the backbone repeat units include an aliphatic group, an aromatic group, or a combination thereof.

In some embodiments, the aliphatic group is alkyl, alkenyl, alkynyl, cycloalkyl, or heterocyclyl, each of which may optionally be substituted with one or more of alkyl, alkenyl, alkynyl, cycloalkyl, heterocycloalkyl, aryl, alkaryl, alkyl heteroaryl, amino, ammonium, acyl, acyloxy, acylamino, aminocarbonyl, alkoxycarbonyl, ureido, carbamate, aryl, heteroaryl, sulfinyl, sulfonyl, hydroxyl, alkoxy, sulfanyl, halo, carboxy, trihalomethyl, cyano, hydroxy, mercapto, or nitro. In some embodiments, the aliphatic group is alkyl, perfluoroalkyl, or alkyl ether.

In some embodiments, the aromatic group is aryl, heteroaryl, or aralkyl, each of which may optionally be substituted with one or more of alkyl, alkenyl, alkynyl, aryl, cycloalkyl, heterocycloalkyl, amino, ammonium, acyl, acyloxy, acylamino, aminocarbonyl, alkoxycarbonyl, ureido, carbamate, sulfinyl, sulfonyl, hydroxyl, alkoxy, sulfanyl, halo, carboxy, trihalomethyl, cyano, hydroxy, mercapto, or nitro. In some embodiments, the aryl is phenyl, biphenyl, triphenyl, naphthyl, or anthracenyl. In some embodiments, the aromatic group is a bisphenol, a bi- or triphenyl, a sulfone, an ether sulfone, an ether ketone, an ether ketone, or a fluorene.

In some embodiments, the non-macrocyclic pendant group or backbone repeat units have a structure selected from the group consisting of:

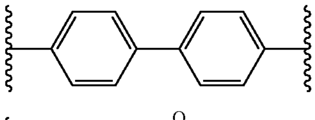
,
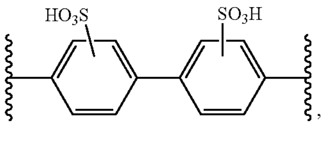
,
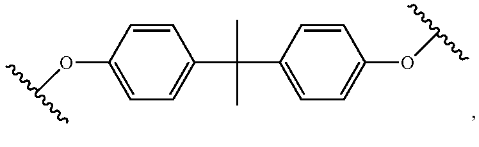
,
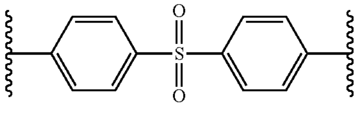
,

-continued
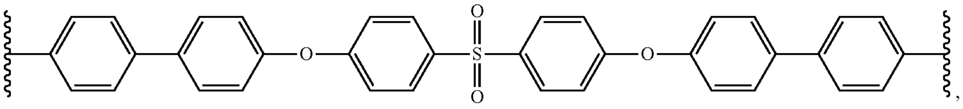,
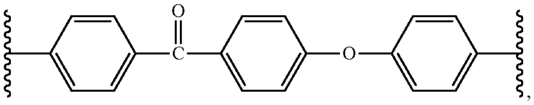, 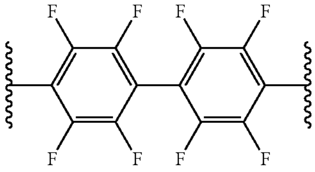,
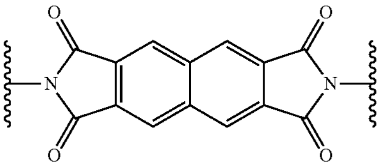, 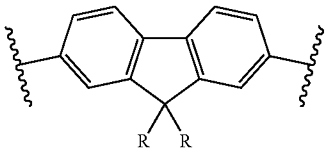, 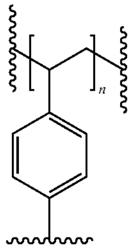, 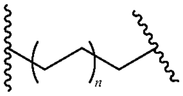,
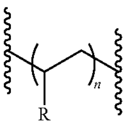, and 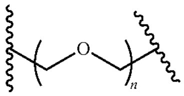;
wherein R is an aliphatic and/or aromatic unit, and n is an integer from 1 to 10.
In some embodiments, the ion conducting material has a macrocycle selected from the group consisting of:
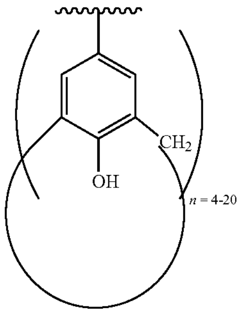
-continued
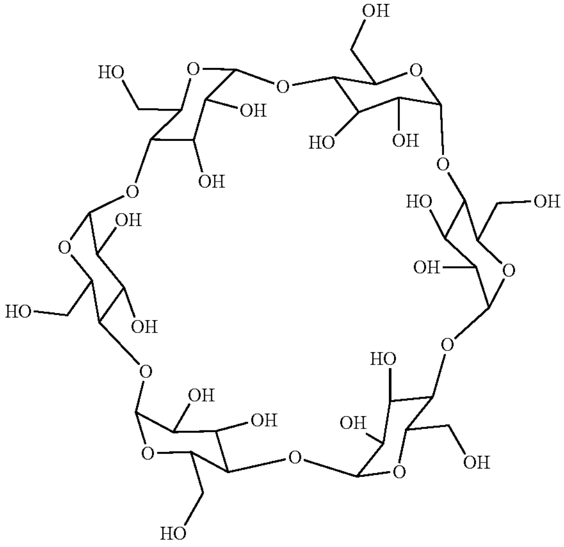

-continued
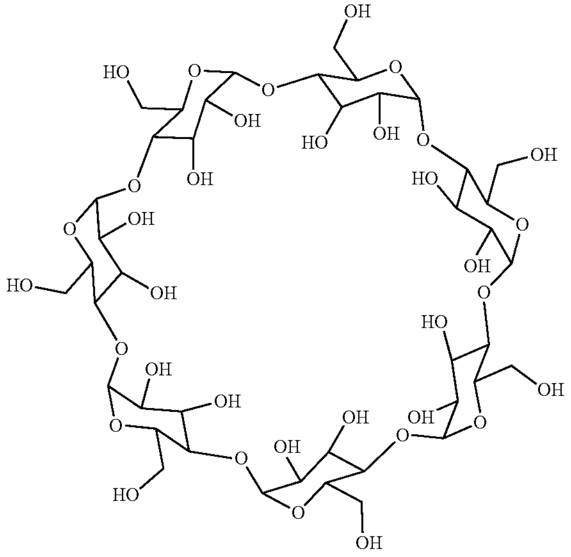
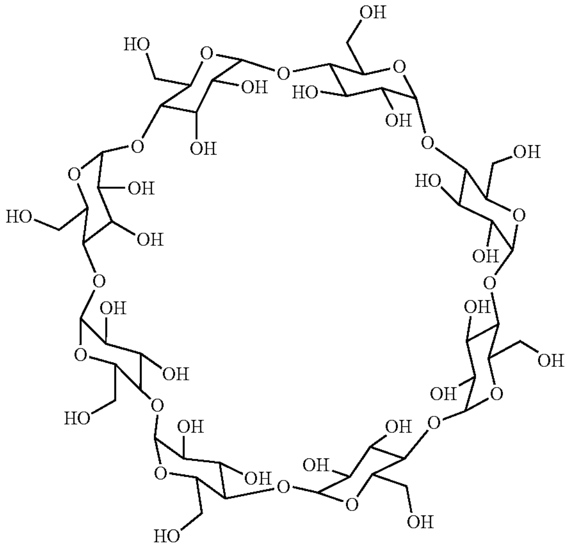
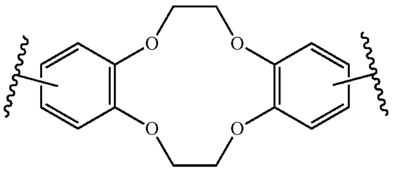
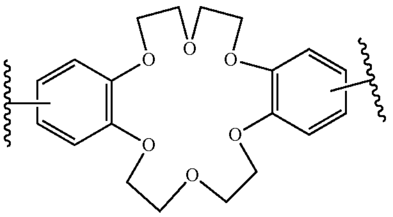
-continued
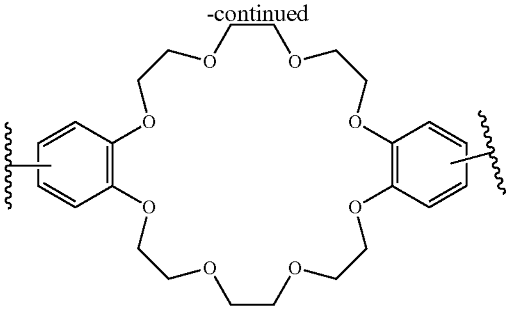
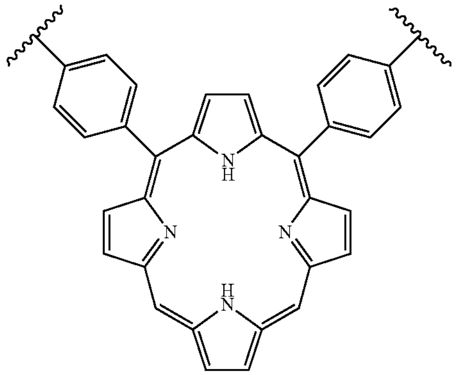
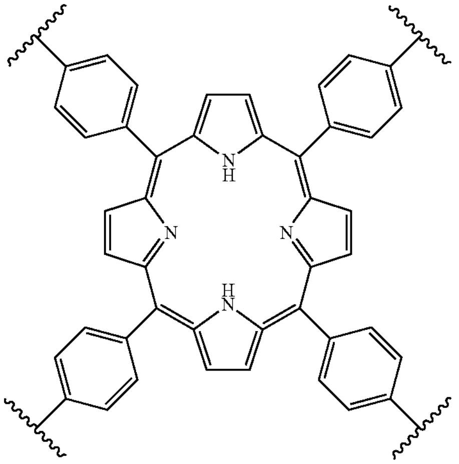
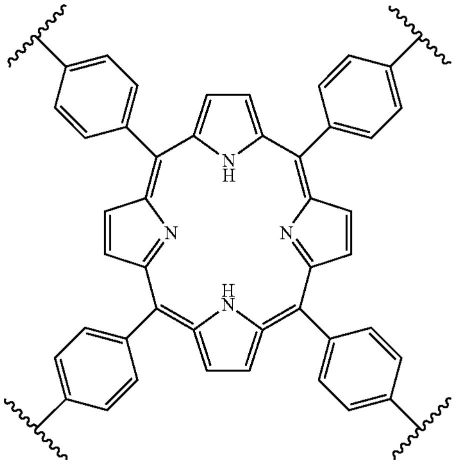
In some embodiments, the macrocycle is gated. In some embodiments, the macrocycle is non-gated.
In some embodiments, at least a portion of the ion conducting material is phase-segregated, self-assembled, or both, in one or more of a spiral, barrel, stacked, ellipsoidal, spheroidal, or other configuration.

In some embodiments, a sub-micron thick film has a proton conductivity of greater than or equal to $1\times10^{-3}$ mS/cm at a relative humidity of 25% or less. In some embodiments, a sub-micron thick film has a proton conductivity in a sub-micron thick film ranges between about 1.4 and about 65 mS/cm at a relative humidity of 75% or greater. In some embodiments, a sub-micron thick film has a proton conductivity in a sub-micron thick film is 65 mS/cm or greater at a relative humidity of 75% or greater.

Other embodiments include an ion-conducting membrane containing the ion conducting material as disclosed herein.

Other embodiments include an ion conducting material as disclosed herein, configured for use in a device, wherein the device is an energy conversion device, an energy storage device, or a filtration or purification device.

Other embodiments include an ion conducting material as disclosed herein, for use in a hydrogen fuel cell, a direct methanol fuel cell, a redox flow battery, an alkali metal ion battery, a water desalination device, a nanofiltration device, or an ultrafiltration device.

Other embodiments include an ion conducting material as disclosed herein, for use as a separation membrane or a catalyst binder.

These and other features, aspects, and advantages of the disclosure will be apparent from the following detailed description together with the accompanying drawings, which are briefly described below.

BRIEF DESCRIPTION OF THE DRAWINGS

In order to provide an understanding of embodiments of the disclosure, reference is made to the appended drawings, which are not necessarily drawn to scale, and in which reference numerals refer to components of exemplary embodiments of the disclosure. The drawings are exemplary only, and should not be construed as limiting the disclosure.

FIG. 11C and FIG. 11F; height images and amplitude images, respectively) structures for embodiments of the disclosure.

DETAILED DESCRIPTION

Figure 1:
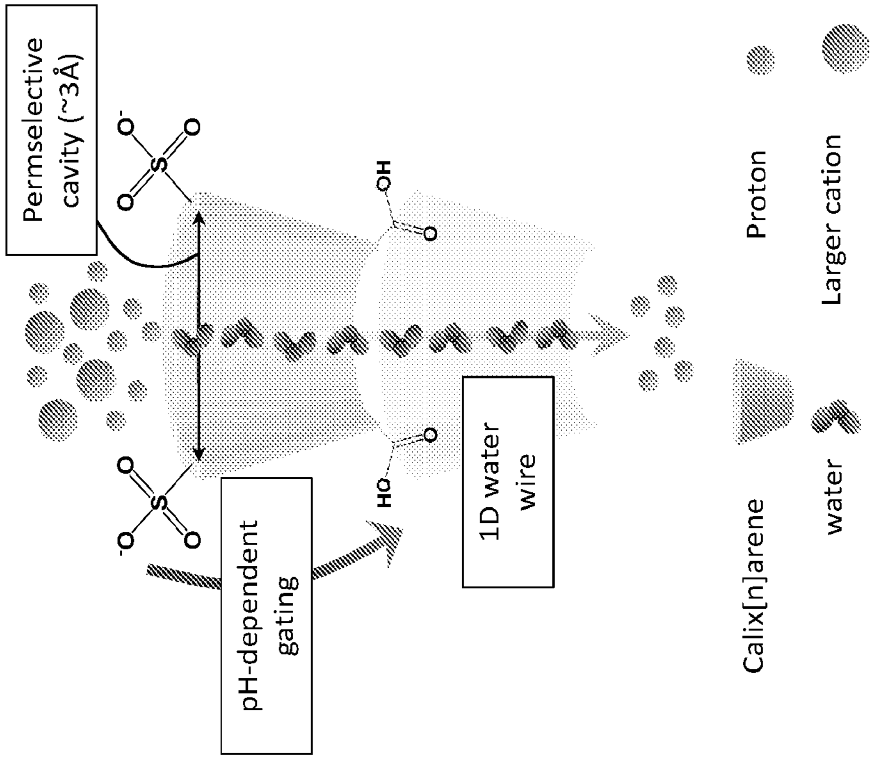
FIG. 1 is a schematic rendering of a potential mode of ion conduction through the pore of a representative calix[n] arene-based polymeric ionomer according to a non-limiting embodiment of the disclosure.

The present disclosure now will be described more fully hereinafter with reference to certain embodiments thereof. These embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. It will be readily apparent to one of ordinary skill in the relevant arts that suitable modifications and adaptations to the compositions, methods, and applications described herein can be made without departing from the scope of any embodiments or aspects thereof.

The compositions and methods provided are exemplary and are not intended to limit the scope of the claimed embodiments. Therefore, it is to be understood that the disclosure is not to be limited to the specific embodiments disclosed and that modifications and other embodiments are intended to be included within the scope of the appended claims. The use of any and all examples, or exemplary language (e.g., "such as") provided herein, is intended merely to better illustrate the materials and methods and does not pose a limitation on the scope unless otherwise claimed. No language in the specification should be construed as indicating any non-claimed element as essential to the practice of the disclosed materials and methods.

All of the various embodiments, aspects, and options disclosed herein can be combined in all variations. The scope of the compositions, formulations, methods, and processes described herein include all actual or potential combinations of embodiments, aspects, options, examples, and preferences herein. Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments. The disclosure includes any of the above-noted embodiments or any combination of two, three, four, or more of the above-noted embodiments, as well as combinations of any two, three, four, or more features or elements set forth in this disclosure, regardless of whether such features or elements are expressly combined in a specific embodiment description herein. This disclosure is intended to be read holistically such that any separable features or elements of the disclosed technologies, in any of its various aspects and embodiments, should be viewed as intended to be combinable unless the context clearly dictates otherwise.

All methods described herein can be performed in any suitable order unless otherwise indicated herein or otherwise clearly contradicted by context. All patents and publications cited herein are incorporated by reference herein for the specific teachings thereof as noted, unless other specific statements of incorporation are specifically provided. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

Definitions

The term "acyl" as used herein refers to —C(═O)R, wherein R is hydrogen ("aldehyde"), $C_1$-$C_{12}$ alkyl, $C_2$-$C_{12}$ alkenyl, $C_2$-$C_{12}$ alkynyl, $C_3$-$C_7$ carbocyclyl, $C_6$-Cao aryl, 5-10 membered heteroaryl, or 5-10 membered heterocyclyl, as defined herein. Non-limiting examples include formyl, acetyl, propanoyl, benzoyl, and acryloyl.

The term "$C_1$-$C_{12}$ alkyl" as used herein refers to a straight chain or branched, saturated hydrocarbon having from 1 to 12 carbon atoms. Representative $C_1$-$C_{12}$ alkyl groups include, but are not limited to, -methyl, -ethyl, -n-propyl, -n-butyl, -n-pentyl, and -n-hexyl; while branched $C_1$-$C_{12}$ alkyls include, but are not limited to, -isopropyl, -sec-butyl, -isobutyl, -tert-butyl, -isopentyl, and 2-methylbutyl. A $C_1$-$C_{12}$ alkyl group can be unsubstituted or substituted.

The term "alkenyl" as used herein refers to $C_2$-$C_{12}$ hydrocarbon containing normal, secondary, or tertiary carbon atoms with at least one site of unsaturation, i.e., a carbon-carbon, $sp^2$ double bond. Examples include, but are not limited to: ethylene or vinyl, -allyl, -1-butenyl, -2-butenyl, -isobutylenyl, -1-pentenyl, -2-pentenyl, -3-methyl-1-butenyl, -2-methyl-2-butenyl, -2,3-dimethyl-2-butenyl, and the like. An alkenyl group can be unsubstituted or substituted.

"Alkynyl" as used herein refers to a $C_2$-$C_{12}$ hydrocarbon containing normal, secondary, or tertiary carbon atoms with at least one site of unsaturation, i.e., a carbon-carbon, sp triple bond. Examples include, but are not limited to acetylenic and propargyl. An alkynyl group can be unsubstituted or substituted.

"Aryl" as used herein refers to a $C_6$-$C_{20}$ carbocyclic aromatic group. Examples of aryl groups include, but are not limited to, phenyl, naphthyl and anthracenyl. An aryl group can be unsubstituted or substituted.

"Arylalkyl" as used herein refers to an acyclic alkyl radical in which one of the hydrogen atoms bonded to a carbon atom, typically a terminal or $sp^3$ carbon atom, is replaced with an aryl radical. Typical arylalkyl groups include, but are not limited to, benzyl, 2-phenylethan-1-yl, 2-phenylethen-1-yl, naphthyl methyl, 2-naphthylethan-1-yl, 2-naphthylethen-1-yl, naphthobenzyl, 2-naphthophenylethan-1-yl, anthracenyl, and the like. The arylalkyl group comprises 6 to 20 carbon atoms, e.g. the alkyl moiety, including alkanyl, alkenyl or alkynyl groups, of the arylalkyl group is 1 to 6 carbon atoms and the aryl moiety is 6 to 14 carbon atoms. An arylalkyl group can be unsubstituted or substituted.

"Cycloalkyl" as used herein refers to a saturated carbocyclic radical, which may be mono- or bicyclic. Cycloalkyl groups include a ring having 3 to 7 carbon atoms as a monocycle or 7 to 12 carbon atoms as a bicycle. Examples of monocyclic cycloalkyl groups include cyclopropyl, cyclobutyl, cyclopentyl, cyclohexyl, cycloheptyl, and cyclooctyl. A cycloalkyl group can be unsubstituted or substituted.

"Cycloalkenyl" as used herein refers to an unsaturated carbocyclic radical, which may be mono- or bicyclic. Cycloalkenyl groups include a ring having 3 to 6 carbon atoms as a monocycle or 7 to 12 carbon atoms as a bicycle. Examples of monocyclic cycloalkenyl groups include 1-cyclopent-1-enyl, 1-cyclopent-2-enyl, 1-cyclopent-3-enyl, 1-cyclohex-1-enyl, 1-cyclohex-2-enyl, and 1-cyclohex-3-enyl. A cycloalkenyl group can be unsubstituted or substituted.

"Heteroaralkyl" as used herein refers to an acyclic alkyl radical in which one of the hydrogen atoms bonded to a carbon atom, typically a terminal or $sp^3$ carbon atom, is replaced with a heteroaryl radical. Typical heteroarylalkyl groups include, but are not limited to, 2-benzimidazolylmethyl, 2-furylethyl, and the like. The heteroarylalkyl group comprises 6 to 20 carbon atoms, e.g. the alkyl moiety, including alkanyl, alkenyl or alkynyl groups, of the heteroarylalkyl group is 1 to 6 carbon atoms and the heteroaryl moiety is 5 to 14 carbon atoms and 1 to 3 heteroatoms selected from N, O, P, and S. The heteroaryl moiety of the heteroarylalkyl group may be a monocycle having 3 to 7 ring members (2 to 6 carbon atoms or a bicycle having 7 to 10 ring members (4 to 9 carbon atoms and 1 to 3 heteroatoms selected from N, O, P, and S), for example: a bicyclo[4,5], [5,5], [5,6], or [6,6] system.

"Heteroaryl" and "heterocycloalkyl" as used herein refer to an aromatic or non-aromatic ring system, respectively, in which one or more ring atoms is a heteroatom, e.g. nitrogen, oxygen, and sulfur. The heteroaryl or heterocycloalkyl radical comprises 2 to 20 carbon atoms and 1 to 3 heteroatoms selected from N, O, P, and S. A heteroaryl or heterocycloalkyl may be a monocycle having 3 to 7 ring members (2 to 6 carbon atoms and 1 to 3 heteroatoms selected from N, O, P, and S) or a bicycle having 7 to 10 ring members (4 to 9 carbon atoms and 1 to 3 heteroatoms selected from N, O, P, and S), for example: a bicyclo[4,5], [5,5], [5,6], or [6,6] system. Heteroaryl and heterocycloalkyl can be unsubstituted or substituted.

Heteroaryl and heterocycloalkyl groups are described in Paquette, Leo A.; "Principles of Modern Heterocyclic Chemistry" (W. A. Benjamin, New York, 1968), particularly Chapters 1, 3, 4, 6, 7, and 9; "The Chemistry of Heterocyclic Compounds, A series of Monographs" (John Wiley & Sons, New York, 1950 to present), in particular Volumes 13, 14, 16, 19, and 28; and J. Am. Chem. Soc. (1960) 82:5566.

Examples of heteroaryl groups include by way of example and not limitation pyridyl, thiazolyl, tetrahydrothiophenyl, pyrimidinyl, furanyl, thienyl, pyrrolyl, pyrazolyl, imidazolyl, tetrazolyl, benzofuranyl, thianaphthalenyl, indolyl, indolenyl, quinolinyl, isoquinolinyl, benzimidazolyl, isoxazolyl, pyrazinyl, pyridazinyl, indolizinyl, isoindolyl, 3H-indolyl, 1H-indazolyl, purinyl, 4H-quinolizinyl, phthalazinyl, naphthyridinyl, quinoxalinyl, quinazolinyl, cinnolinyl, pteridinyl, 4aH-carbazolyl, carbazolyl, phenanthridinyl, acridinyl, pyrimidinyl, phenanthrolinyl, phenazinyl, phenothiazinyl, furazanyl, phenoxazinyl, isochromanyl, chromanyl, imidazolidinyl, imidazolinyl, pyrazolidinyl, pyrazolinyl, benzotriazolyl, benzisoxazolyl, and isatinoyl.

Examples of heterocycloalkyls include by way of example and not limitation dihydroypyridyl, tetrahydropyridyl (piperidyl), tetrahydrothiophenyl, piperidinyl, 4-piperidonyl, pyrrolidinyl, 2-pyrrolidonyl, tetrahydrofuranyl, tetrahydropyranyl, bis-tetrahydropyranyl, tetrahydroquinolinyl, tetrahydroisoquinolinyl, decahydroquinolinyl, octahydroisoquinolinyl, piperazinyl, quinuclidinyl, and morpholinyl.

By way of example and not limitation, carbon bonded heteroaryls and heterocycloalkyls are bonded at position 2, 3, 4, 5, or 6 of a pyridine, position 3, 4, 5, or 6 of a pyridazine, position 2, 4, 5, or 6 of a pyrimidine, position 2, 3, 5, or 6 of a pyrazine, position 2, 3, 4, or 5 of a furan, tetrahydrofuran, thiofuran, thiophene, pyrrole or tetrahydropyrrole, position 2, 4, or 5 of an oxazole, imidazole or thiazole, position 3, 4, or 5 of an isoxazole, pyrazole, or isothiazole, position 2 or 3 of an aziridine, position 2, 3, or 4 of an azetidine, position 2, 3, 4, 5, 6, 7, or 8 of a quinoline or position 1, 3, 4, 5, 6, 7, or 8 of an isoquinoline. Still more typically, carbon bonded heterocycles include 2-pyridyl, 3-pyridyl, 4-pyridyl, 5-pyridyl, 6-pyridyl, 3-pyridazinyl, 4-pyridazinyl, 5-pyridazinyl, 6-pyridazinyl, 2-pyrimidinyl, 4-pyrimidinyl, 5-pyrimidinyl, 6-pyrimidinyl, 2-pyrazinyl, 3-pyrazinyl, 5-pyrazinyl, 6-pyrazinyl, 2-thiazolyl, 4-thiazolyl, or 5-thiazolyl.

By way of example and not limitation, nitrogen bonded heteroaryls and heterocycloalkyls are bonded at position 1 of an aziridine, azetidine, pyrrole, pyrrolidine, 2-pyrroline, 3-pyrroline, imidazole, imidazolidine, 2-imidazoline, 3-imidazoline, pyrazole, pyrazoline, 2-pyrazoline, 3-pyrazoline, piperidine, piperazine, indole, indoline, 1H-indazole, position 2 of a isoindole, or isoindoline, position 4 of a morpholine, and position 9 of a carbazole, or beta-carboline. Still more typically, nitrogen bonded heterocycles include 1-aziridyl, 1-azetedyl, 1-pyrrolyl, 1-imidazolyl, 1-pyrazolyl, and 1-piperidinyl.

"Substituted" as used herein and as applied to any of the above alkyl, alkenyl, alkynyl, aryl, arylalkyl, cycloalkyl, heteroaryl, heterocyclyl, and the like, means that one or more hydrogen atoms are each independently replaced with a substituent. Typical substituents include, but are not limited to, —X, —R, —OH, —OR, —SH, —SR, $NH_2$, —NHR, $—N(R)_2$, $—N^+(R)_3$, $—CX_3$, —CN, —OCN, —SCN, —NCO, —NCS, —NO, $—NO_2$, $—N_3$, —NC(=O)H, —NC(=O)R, —C(=O)H, —C(=O)R, $—C(=O)NH_2$, $—C(=O)N(R)_2$, $—SO_3—$, $—SO_3H$, $—S(=O)_2R$, $—OS(=O)_{20}R$, $—S(=O)_2NH_2$, $—S(=O)_2N(R)_2$, —S(=O)R, $—OP(=O)(OH)_2$, $—OP(=O)(OR)_2$, $—P(=O)(OR)_2$, $—PO_3$, $—PO_3H_2$, —C(=O)X, —C(=S)R, $—CO_2H$, $—CO_2R$, $—CO_2—$, —C(=S)OR, —C(=O)SR, —C(=S)SR, $—C(=O)NH_2$, $—C(=O)N(R)_2$, $—C(=S)NH_2$, $—C(=S)N(R)_2$, $—C(=NH)NH_2$, and $—C(=NR)N(R)_2$; wherein each Xis independently selected for each occasion from F, Cl, Br, and I; and each R is independently selected for each occasion from $C_1$-$C_{12}$ alkyl, $C_6$-$C_{20}$ aryl, $C_3$-$C_{14}$ heterocycloalkyl, heteroaryl, or protecting group moiety. Wherever a group is described as "optionally substituted," that group can be substituted with one or more of the above substituents, independently for each occasion.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as $—CH_2—$, $—CH_2CH_2—$, $—CH_2CH(CH_3)CH_2—$, and the like. Other radical naming conventions clearly indicate that the radical is a di-radical such as "alkylene," "alkenylene," "arylene," "heterocycloalkylene," and the like.

Wherever a substituent is depicted as a di-radical (i.e., has two points of attachment to the rest of the molecule), it is to be understood that the substituent can be attached in any directional configuration unless otherwise indicated.

In one aspect is provided an ion conducting material comprising one or more macrocyclic repeat units (RU) comprising a macrocycle, and either a pendant group or one or more backbone repeat units, wherein the pendant group or the backbone repeat units are chemically bonded to the macrocycle. Surprisingly, according to the present disclosure, it has been found that certain combinations of such macrocyclic units and pendant groups or backbone repeat units provide materials which exhibit favorable ion conductivity, even in thin film applications. The materials further exhibit one or more of ion permselectivity, mechanical strength, self-assembly, stacking, and gating behavior. Each of the material components and the structures and properties of the ion conducting materials are described further herein below.

I. Macrocycles

As used herein, the term "macrocycle" refers to a molecule with a central cavity or pore having a diameter in the nano- or sub-nanometer range. When rendered hydrophilic, suitable macrocycles can conduct ions. This hydrophilicity can be imparted by the presence of polar groups (e.g., hydroxyl) and/or ion conducting functional groups (e.g., cationic or anionic functional groups). The macrocyclic units provide hydrophilic channels to facilitate long-range ion conduction (FIG. 1). Suitable macrocycles include, but are not limited to, calix[n]arenes, cyclodextrins, dibenzo-x-crown-y (crown ethers), and phenyl porphyrins, each of which is described further herein below.

Cyclodextrins

Figure 2:
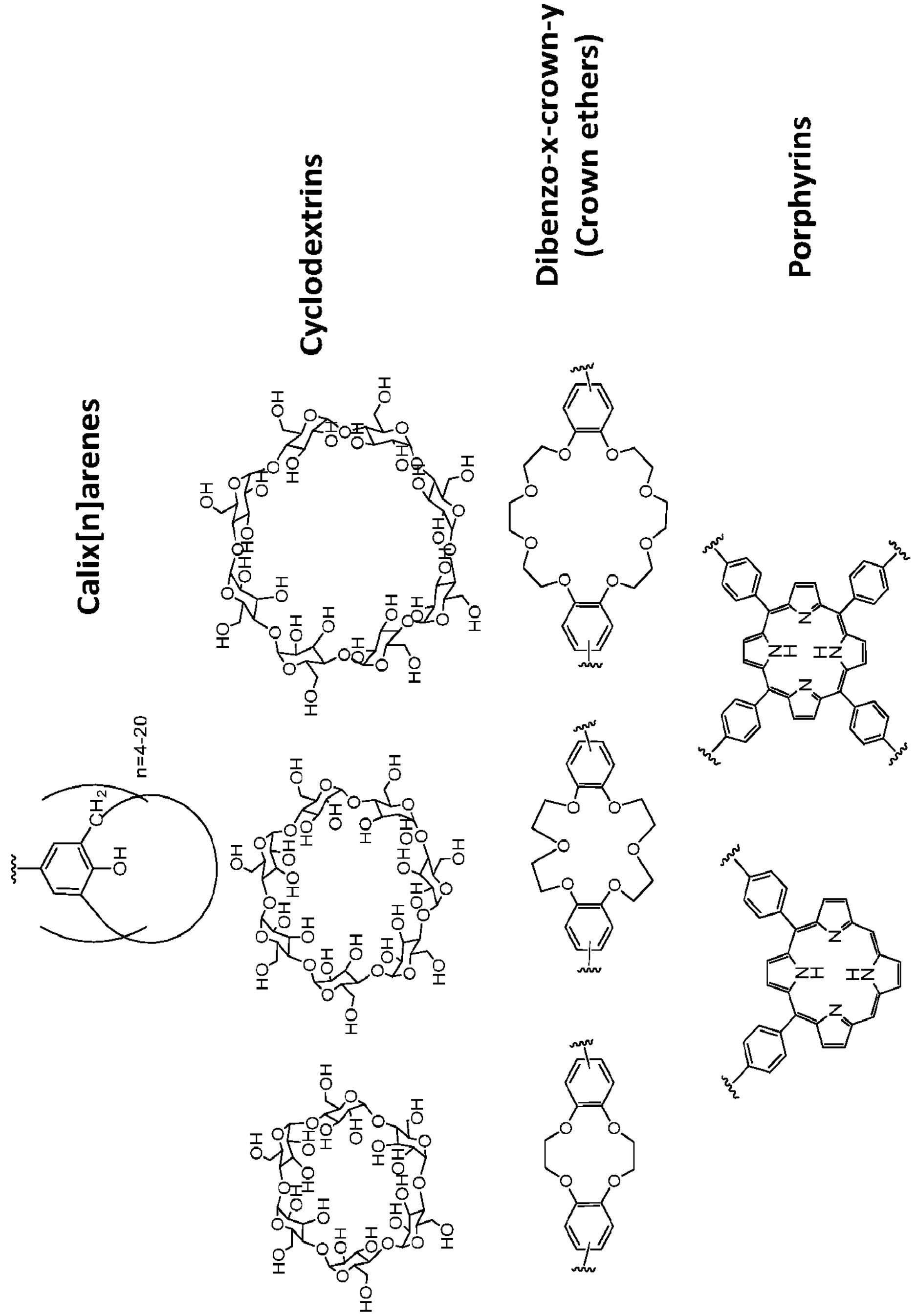
FIG. 2 is a schematic illustration of suitable non-limiting examples of macrocycles.

In some embodiments, the macrocycle is a cyclodextrin. Cyclodextrins are a family of cyclic oligosaccharides. The toroidal shaped molecules have hydrophilic outer surface with many exposed hydroxyl groups. The interior (or cavity) of the molecules are considerably less hydrophilic, but not hydrophobic. In some embodiments, the cyclodextrin is a α-cyclodextrin, a β-cyclodextrin, or a γ-cyclodextrin, non-limiting examples of each of which are provided in FIG. 2.

Crown Ethers

In some embodiments, the macrocycle is a crown ether. Non-limiting examples of suitable crown ethers include dibenzo-12-crown-4, dibenzo-18-crown-6, or dibenzo-24-crown-8, illustrated in FIG. 2. Other non-limiting examples of suitable crown ethers include dibenzo-x-crown-y, where x is a multiple of 3 and is between 12 to 81, and y is x/3. Generally, one or both of the benzo groups can be modified with a carbon or heteroatom handle from which to further functionalize the crown ether macrocycle with, e.g., one or more pendant groups or one or more backbone repeat units. In some embodiments, the benzo groups are substituted with an amino group.

Calix[n]Arenes

In some embodiments, the macrocycle comprises a calix[n]arene. Calix[n]arenes are cone- or basket-shaped macrocycles or cyclic oligomers based on a hydroxyalkylation product of a phenol and an aldehyde, where "n" reflects the number of repeating [(1,3-phenylene)methylene] units. In some embodiments, n is an integer of from about 4 to about 20. Suitable calix[n]arenes may be represented by the general formula (I):

(I)

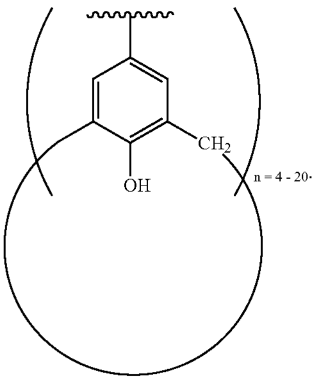

The calix[n]arene central cavities naturally produce nanochannels, the diameter of which can be tuned by changing the number "n". For example, pore diameters of calix[n]arenes are 3, 7.6 and 11.8 Å for n=4, 6, and 8, respectively. In some embodiments, n is an integer from about 4 to about 8. In some embodiments, n is 4. A common, non-limiting precursor of functionalized calix[n]arenes where n=4 is the p-tert-butylcalix[4]arene (1).

1

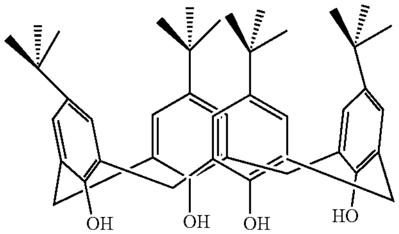

Generally, the hydrophilicity and ion conducting properties of such calix[n]arenes may be modulated by functionalizing the phenolic hydroxyl groups and/or introducing polar or charged functionalities, such as sulfonic acid, carboxylic acid or phosphonic acid groups. In some embodiments, one or more of the phenyl rings bear a sulfonic acid group. In some embodiments, each of the phenyl rings bears a sulfonic acid group. In some embodiments, one or more of the phenolic hydroxyl groups are alkylated with, for example, methyl, ethyl, or propyl groups.

In some embodiments, the calix[n]arenes have separate functionalities on the two rims, creating a differential charge distribution at the ends of the macrocycles, and providing an electrochemical potential gradient driving ion conduction through the macrocycles. Such macrocycles, or the materials comprising them, may be referred to as "gated" (see, for example, FIG. 1, which illustrates a non-limiting gated embodiment). Without wishing to be bound by theory, it is believed that using thin films of such bifunctional macrocycle-containing ionomers or incorporation of such bifunctional macrocycles within a neutral, non-ion conducting membrane matrix, an ion conducting thin film or bulk membrane may be created with pH dependent ion conductivity, allowing lesser proton accumulation in highly acidic environments. In some embodiments, each phenyl unit bears a hydroxyl group and a sulfonic acid, carboxylic acid, or phosphonic acid group (i.e., cation exchange groups) in a para-orientation. In some embodiments, each phenyl unit bears a sulfonic acid group and a carboxylic acid/phosphonic acid group in a para-orientation. In some embodiments, each phenyl unit bears anion exchange groups (including, but not limited to, quaternary amine, or imidazolium groups), instead of cation exchange groups. While the cation exchange functionality allows transport of protons or cations, anion exchange functionality allows transport of anions. In some embodiments, the ion conducting material comprises a neutral membrane and a monomeric calix[n]arene having an electrochemical potential gradient along the channel thereof. As a non-limiting example, the neutral membrane may comprise polyvinyl alcohol (PVA), poly(ethylene terephthalate) (PET)), polyimide, or polyamide.

Porphyrins

In some embodiments, the macrocycle comprises a porphyrin. Porphyrins are large ring molecules consisting of 4 pyrrole units interconnected at their a carbon atoms via methine bridges. The porphyrin can be substituted. For example, in some embodiments, the porphyrin is a phenyporphyrin. Non-limiting examples of suitable phenyporphyrins are provided in FIG. 2.

II. Pendant Groups and Backbone Repeat Units

The ion conducting materials as disclosed herein comprising one or more pendant groups, and/or one or more backbone repeat units. The hydrophobicity and hydrophilicity of the materials can be tuned by adjusting the polarity and/or length of pendant groups and incorporating suitable ion conducting functional groups. Suitable pendant groups and backbone repeat units include different types of aliphatic groups (including, but not limited to perfluoroalkyl, alkyl, ethers, methyl acrylate polymers) and/or aromatic groups (including, but not limited to bisphenol, bi/triphenyls, styrene, ether sulfone, ether ketone, ether ether ketone, fluorene).

In some embodiments, the pendant group or the backbone repeat unit comprises or is an aliphatic group. In some embodiments, the aliphatic group is alkyl, perfluoroalkyl, or alkyl ether. In some embodiments, the aliphatic group is alkyl, alkenyl, alkynyl, cycloalkyl, or heterocyclyl, each of which may optionally be substituted with one or more of alkyl, alkenyl, alkynyl, cycloalkyl, heterocycloalkyl, alkaryl, alkyl heteroaryl, amino, ammonium, acyl, acyloxy, acylamino, aminocarbonyl, alkoxycarbonyl, ureido, carbamate, aryl, heteroaryl, sulfinyl, sulfonyl, hydroxyl, alkoxy, sulfanyl, halo, carboxy, trihalomethyl, cyano, hydroxy, mercapto, or nitro.

In some embodiments, the pendant group or the backbone repeat unit comprises or is an aromatic group. In some embodiments, the aromatic group comprises aryl, heteroaryl, or aralkyl, each of which may optionally be substituted with one or more of alkyl, alkenyl, alkynyl, cycloalkyl, heterocycloalkyl, amino, ammonium, acyl, acyloxy, acylamino, aminocarbonyl, alkoxycarbonyl, ureido, carbamate, sulfinyl, sulfonyl, hydroxyl, alkoxy, sulfanyl, halo, carboxy, trihalomethyl, cyano, hydroxy, mercapto, or nitro. In some embodiments, aromatic group comprises phenyl or naphthyl. In some embodiments, the aromatic group is a bisphenol, a bi- or triphenyl, an ether sulfone, an ether ketone, an ether ether ketone or a fluorene.

In some embodiments, the backbone repeat units comprise a combination of aliphatic and aromatic groups. Without wishing to be bound by theory, it is believed that in some embodiments, a combination of aliphatic and aromatic repeat units can help to promote phase separation and evolution of ordered morphology.

Figure 3:
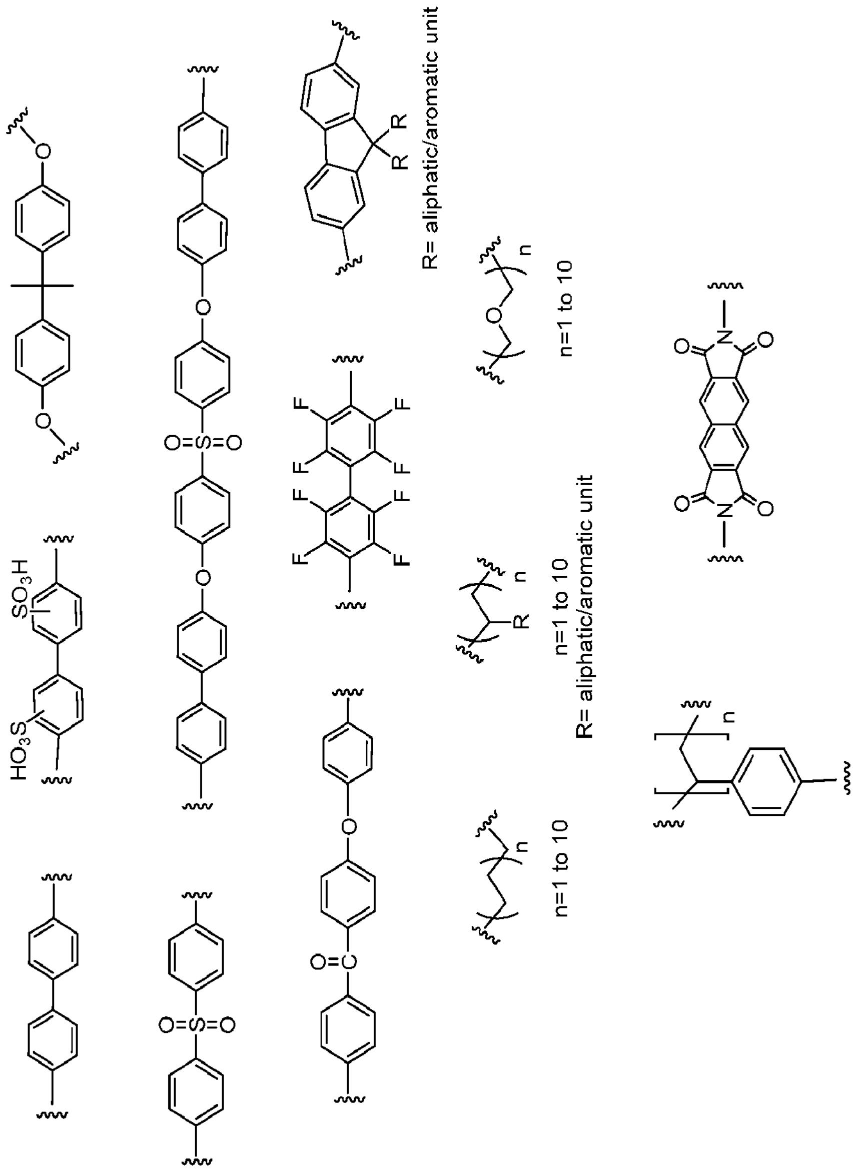
FIG. 3 is a schematic illustration of suitable non-limiting examples of non-macrocyclic pendant and/or backbone groups.

In some embodiments, the backbone repeat units can be fluorinated, non-fluorinated, or a combination thereof. In some embodiments, the backbone repeat units contain single or multiple ion-conducting groups for conducting ions. Without wishing to be bound by theory, it is believed that some hydrocarbon based units can facilitate random/specific hydrophobic interactions and aid in formation of extended ion conducting channels. In some embodiments, the backbone repeat units comprise aromatic or π-conjugated small molecules. Without wishing to be bound by theory, it is believed that relatively hydrophobic, hydrocarbon based repeat units, in certain embodiments, impart mechanical strength to the conducting materials while preventing dissolution in water. Without wishing to be bound by theory, it is believed that some aromatic hydrocarbon based units can facilitate π-π stacking interactions (attractive non-covalent interaction between aromatic rings containing π bonds) and aid in formation of extended ion conducting channels. For example, the phenyl groups in biphenyl or fluorene or other conjugated molecules may facilitate self-assembly of ionomers via π-π stacking (attractive non-covalent interaction between aromatic rings containing π bonds), while the macrocycle (e.g., calix[n]arene, cyclodextrin, or other) provides the hydrophilic channel/cavity/bundle of channels, thereby facilitating long-range ion conduction. The length of channels can be modulated by facilitating certain type of self-assembly (such as by choosing appropriate solvents, material preparation procedure, or both, or other strategies) and controlling the chemical structure of repeat units of the ion-conducting oligomers or polymers. Suitable, non-limiting examples of pendant and backbone (non-macrocyclic) groups include those illustrated in FIG. 3.

Figure 4A:
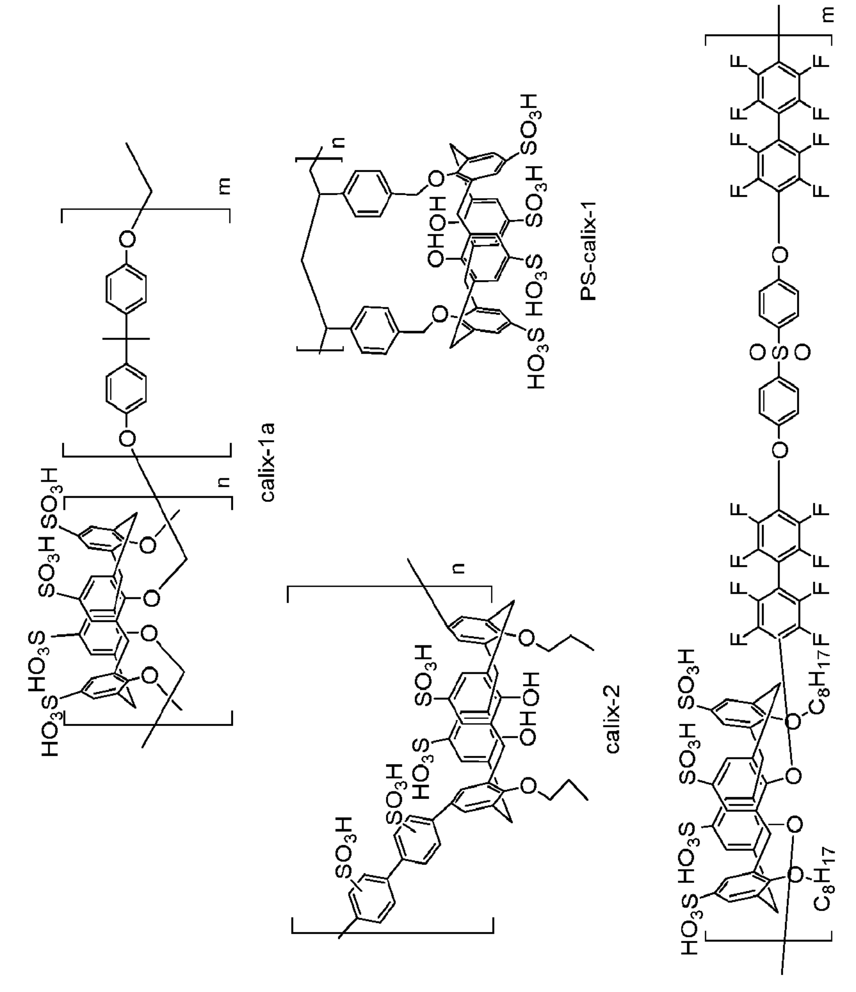
FIG. 4A is a schematic showing non-limiting examples of representative calix[4]arene-based ion conducting materials.
Figure 4B:
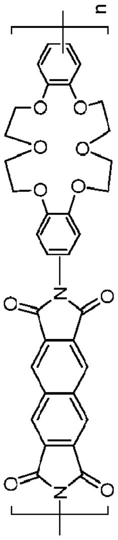
FIG. 4B is a schematic showing non-limiting examples of representative crown ether macrocycle-based ion conducting materials.
Figure 4B:
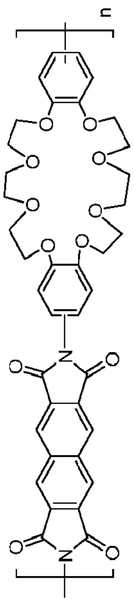
Figure 4B:
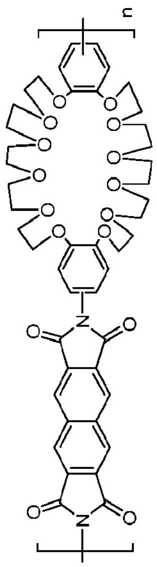

When present as a backbone element, such groups may be repeated to form oligomeric or polymeric backbones. One or more types of non-macrocyclic units can be repeated with macrocyclic units in oligomeric or polymeric backbones/pendants. The macrocyclic units can be present along the backbone, or added as pendant groups to repeat units of a polymer chain. Non-limiting examples of calix[4]arene-based ion conducting materials are shown in FIG. 4A. Some non-limiting examples of crown ether based ion conducting materials are shown in FIG. 4B.

III. Ion Conducting Material Properties

Figure 5A:
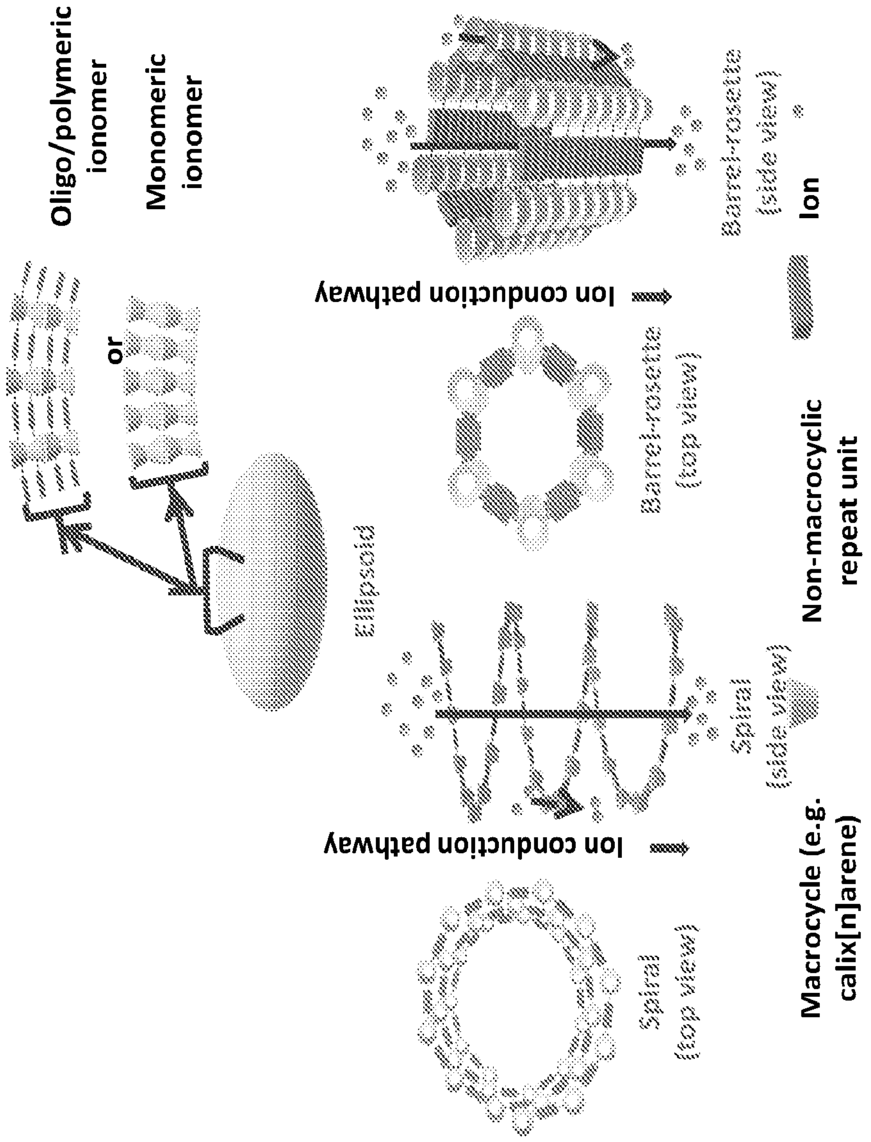
FIG. 5A is a schematic depiction representing self-assembly modes of macrocycle-containing monomeric/oligomeric/polymeric ionomers according to non-limiting embodiments of the disclosure.
Figure 5B:
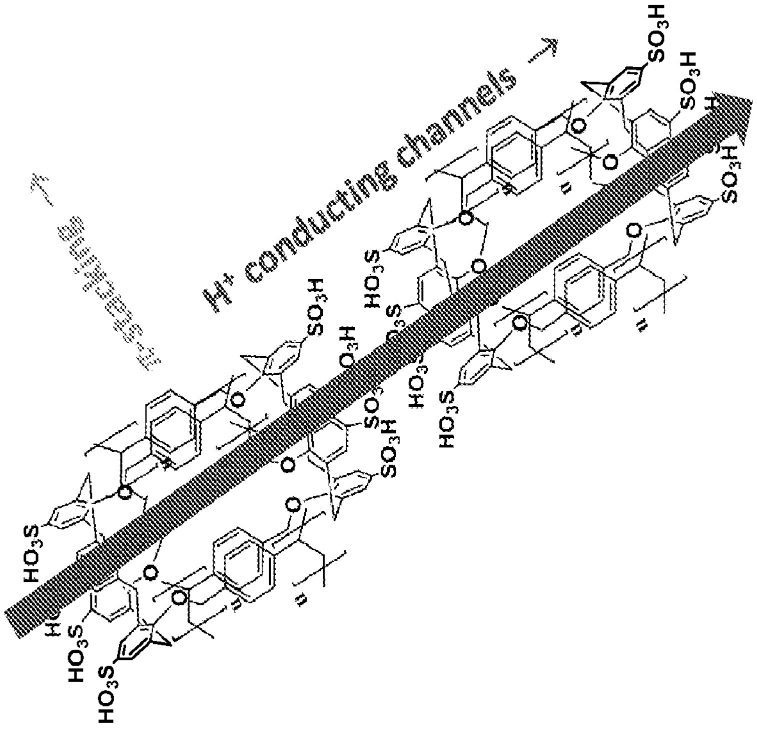
FIG. 5B is a schematic depiction representing a self-assembly mode of a macrocycle-containing monomeric/oligomeric/polymeric ionomer (PS-calix-1) according to a non-limiting embodiment of the disclosure.

In some embodiments, the narrow, but hollow macrocycles in the ion conducting material as disclosed herein may conduct ions like a pore (e.g., as an individual entity). In some embodiments, the ion conducting material can simultaneously conduct ions like an ion channel through self-assembly or stacking of multiple macrocyclic groups in different orientations. In thin films, where the phase separation is often weak (i.e., where hydrophilic and hydrophobic phases are highly mixed, rather than formation of well-defined hydrophilic ionic domains), the use of macrocycle-based ion conducting materials can still provide an ion conducting pathway through the hollow macrocycles. Alternatively, these molecules can self-assemble to very well-defined structures in bulk solution in channel-like structures which can be transferred onto the solid state. Possible modes of self-assembly of embodiments of the disclosure are shown in FIGS. 5A and 5B (ellipsoid, spiral, and barrel-rosette, elongated channel-like). Generally, without wishing to be bound by theory, it is believed that small (i.e., lower molecular weight) ion conducting polymers as disclosed herein, having high mobility, can promote ion conductivity, while large ion conducting polymers as disclosed herein can provide mechanical integrity to the ion conducting materials.

IV. Methods for the Preparation of Ion Conducting Materials

Suitable, non-limiting examples of chemical reactions which may be used to introduce pendant groups and backbone repeat units include condensation polymerization, radical polymerization, atom transfer radical polymerization (ATRP), reversible addition-fragmentation chain transfer (RAFT), Suzuki coupling, and "click" reactions. Provided below are several non-limiting, example schemes illustrating methods for the preparation of embodiments of the disclosure.

In general, macrocycles (e.g., calix[n]arenes) may be functionalized and/or reacted with other backbone units to obtain oligomers/polymers following Suzuki coupling reactions according to Equations 1, 2, or 3, below:

(Eq. 1)

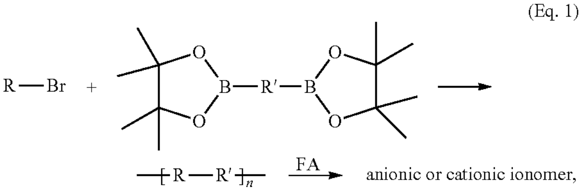

wherein R and R' may both be a macrocycle-based moiety, or one of R and R' is a macrocycle-based moiety and the other is non-macrocycle based; and FA is any cationic or anionic functionalizing agent.

(Eq. 2)

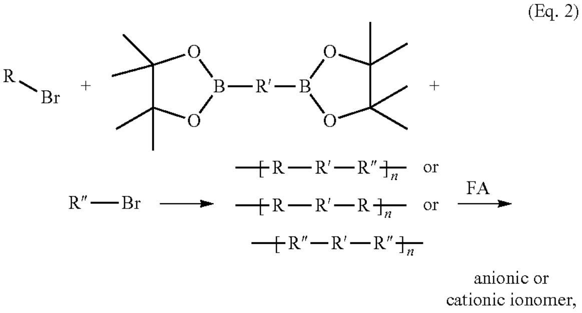

wherein R and R' may both be a macrocycle-based moiety, or one of R and R' is a macrocycle-based moiety and the other is non-macrocycle based; and FA is any cationic or anionic functionalizing agent.

(Eq. 3)

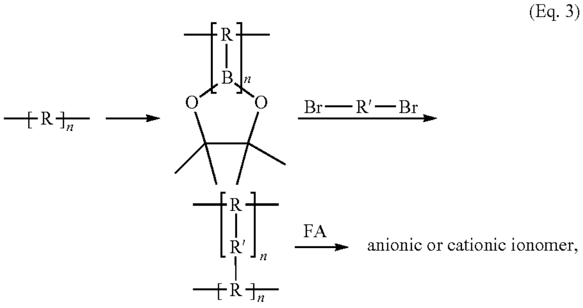

wherein R is non-macrocycle based moiety; R' is a macrocycle-based moiety; and FA is any cationic or anionic functionalizing agent.

In general, macrocycles (e.g., calix[n]arenes) may be functionalized and/or reacted with other backbone units to obtain oligomers/polymers following radical coupling reactions according to Equation 4:

(Eq. 4)

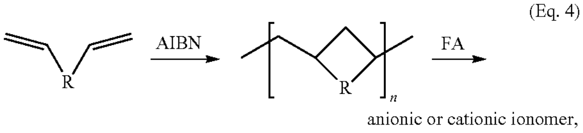

wherein R is a macrocycle-based moiety; AIBN is azo-bis-isobutyronitrile; and FA is any cationic or anionic functionalizing agent.

In general, macrocycles (e.g., calix[n]arenes) may be functionalized and/or reacted with other backbone units to obtain oligomers/polymers following O-alkylation reactions according to Equation 5:

(Eq. 5)

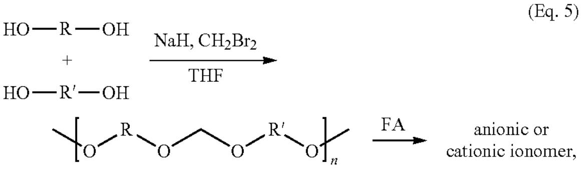

wherein R and R' may both be a macrocycle-based moiety, or one of R and R' is a macrocycle-based moiety and the other is non-macrocycle based; and FA is any cationic or anionic functionalizing agent.

In general, macrocycles (e.g., calix[n]arenes) may be functionalized and/or reacted with other backbone units to obtain oligomers/polymers following "click" reactions according to Equation 6:

(Eq. 6)

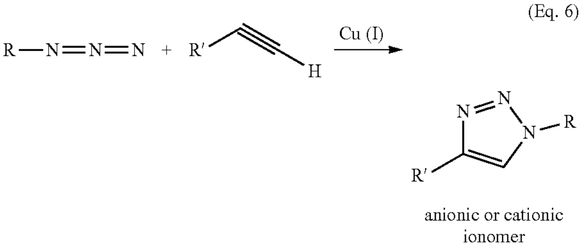

wherein R and R' may both be a macrocycle-based moiety, or one of R and R' is a macrocycle-based moiety and the other is non-macrocycle based; and the macrocyclic moiety may have ion conducting functionality prior to the "click" reaction.

Scheme 1 illustrates the synthesis method utilized to obtain certain embodiments of the disclosure comprising a calix[4]arene (e.g., calix-1a). Generally, the ratio of m to n is about 1:1.

Scheme 1.

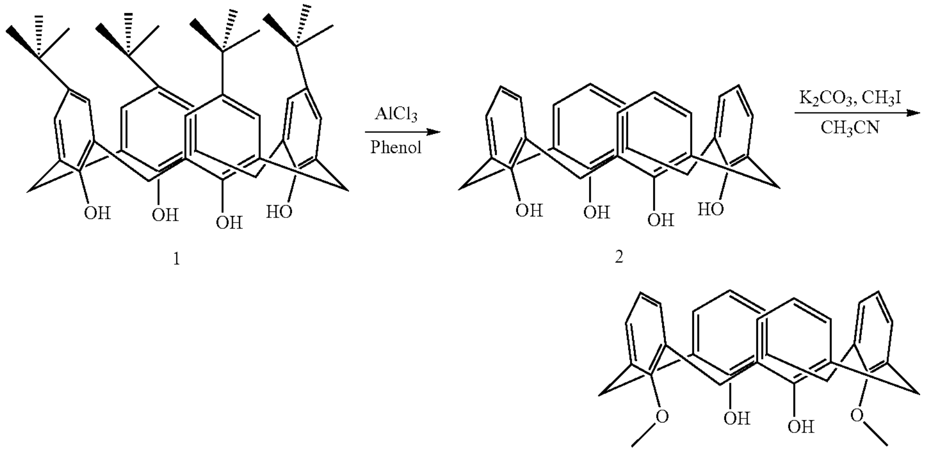

1 2 3

-continued
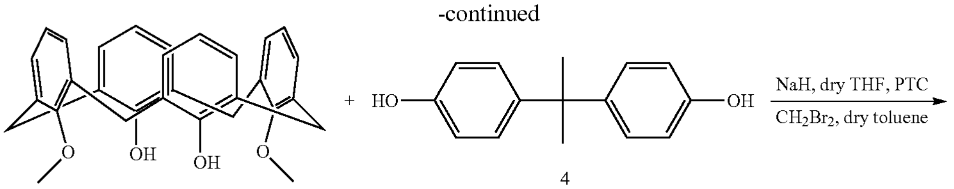
3
4
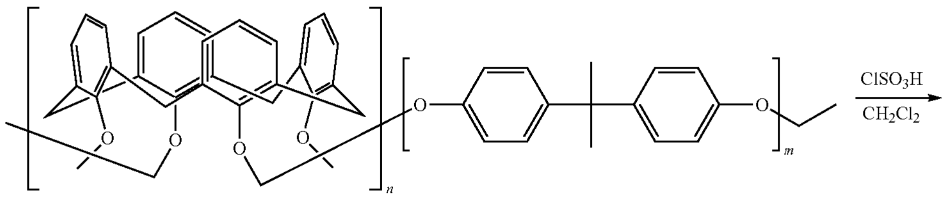
calixn1a
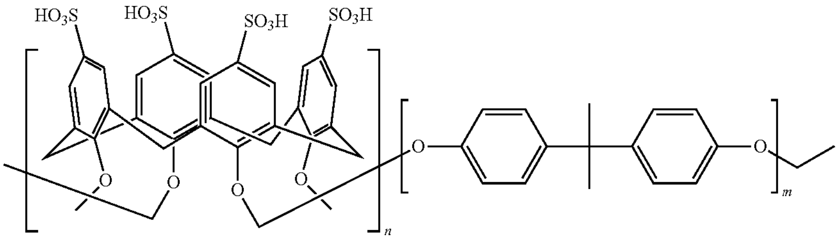
calix1a
Scheme 2 illustrates the synthesis method utilized to obtain certain embodiments of the disclosure comprising a calix[4]arene (e.g., calix-2). Generally, the number of repeat units (n) may be up to about 15. In some embodiments, n is about 11.
Scheme 2.
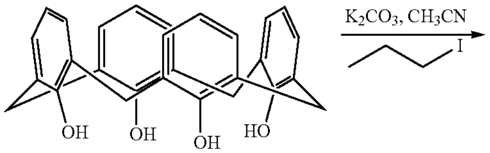
2
-continued
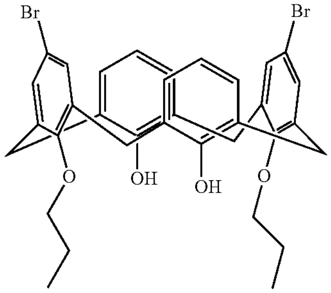
6
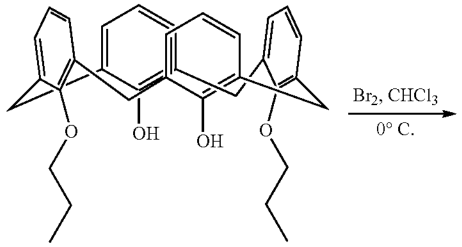
5
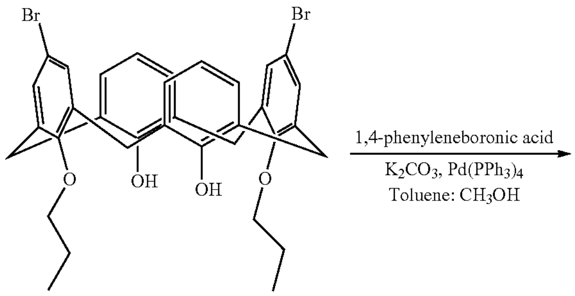
6

-continued

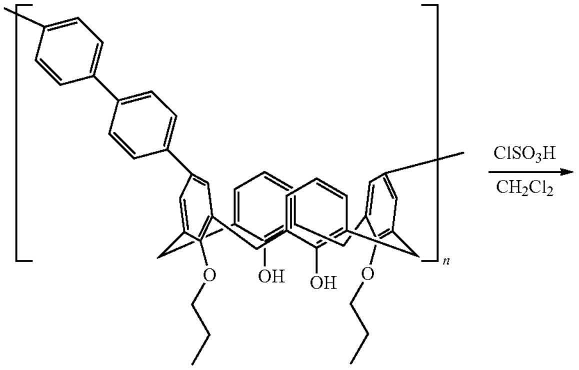

calixn-2

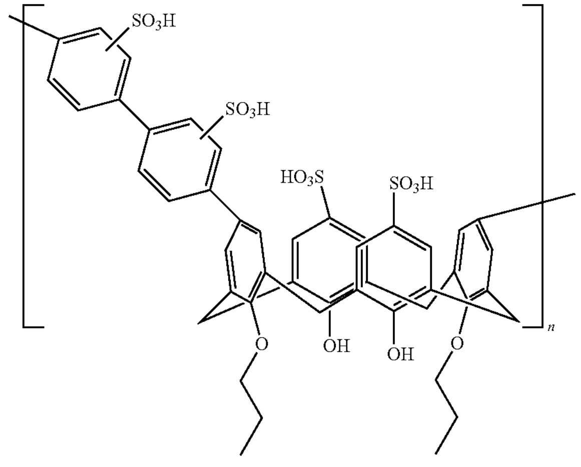

calix-2

Scheme 3 illustrates a non-limiting example of one method utilized to obtain certain embodiments of the disclosure having a styrene based polymer chain wherein the macrocycles (calix[4]arene in this specific case) are attached as pendants to a polystyrene backbone. Generally, the number of repeat units (n) may be up to about 40. In some embodiments, n is about 35.

Scheme 3.

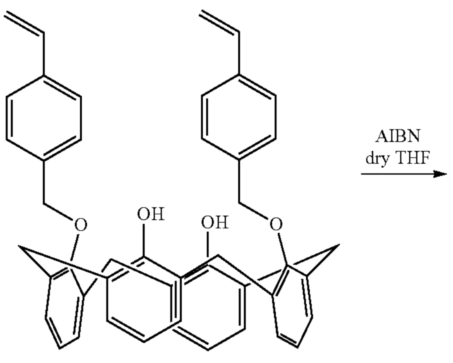

7

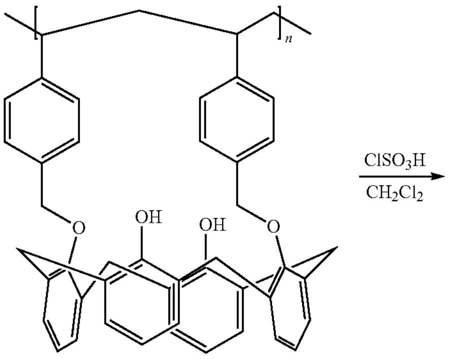

8

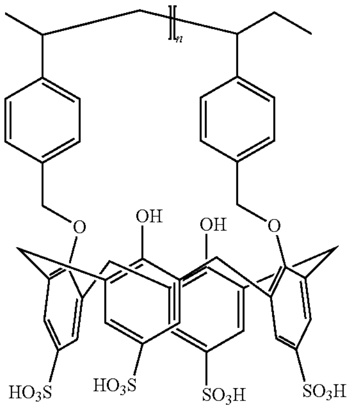

PS-calix-1

Scheme 4 illustrates a non-limiting example of one method which may be used to prepare embodiments of the disclosure having a fluorinated biphenyl/phenylsulfone backbone. Generally, the number of repeat units (n) may be up to about 7, and m may be up to about 30.

Scheme 4.

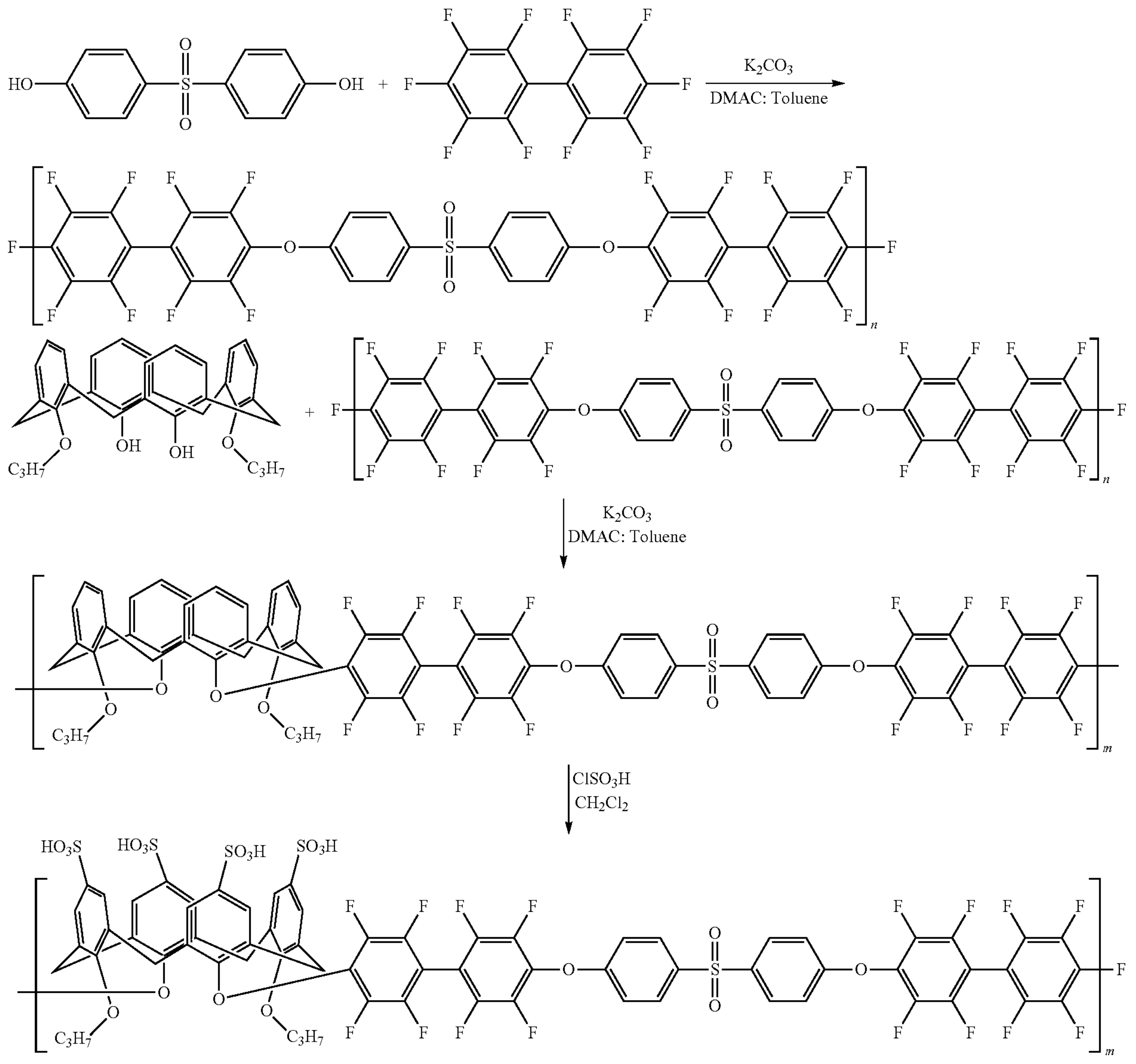

bpF-calix-1

Scheme 5 illustrates suitable, non-limiting examples of chemical structures of certain gated monomeric, oligomeric, and polymeric ionomer embodiments, based on calix[4] arene. Generally, the number of repeat units (n) may be up to 7 (oligomer) and 20 (polymer). In some embodiments, n is about 11 (calix-2 (polymer)). Without wishing to be bound by theory, it is believed that creating differential charge distribution at upper and lower rims of the macrocycle(s), as well as offering pH dependent differential charged states of the functional groups, may govern pH-dependent gating or ion conduction behavior.

Gating is a fundamental feature of many porins, such as OmpF, OmpC, and aquaporin. Charge distribution asymmetry at the ends of the ion channels leads to electrochemical potential gradients and drives ion diffusion across the channels. In synthetic materials, gating is typically achieved by: (i) making more hydrophilic groups reside on one side of the structure forming ion channel; (ii) introducing more negative charges at one end of the channel than the other; or (iii) introducing an electron donor at one end and acceptor at the other end and aligning dipole moment. Even a small asymmetry in charge or hydrophilicity can create large asymmetry when the synthetic units self-assemble Accordingly, in some embodiments are provided monomeric, oligomeric, and polymeric calix[4]arenes functionalized on the upper and lower rims of the calix[4]arene macrocycle. Non-limiting examples are shown in Scheme 5. Again not wishing to be bound by theory, even in the absence of differential charge distribution, macrocycle-based ionomers can, in certain embodiments, exhibit satisfactorily high ion conductivity, believed to be due primarily to ion-conducting functionalities of the macrocyclic cavity and fast ion transfer via one-dimensional water wire through the very narrow cavities (see, e.g., FIG. 5B).

Scheme 5.

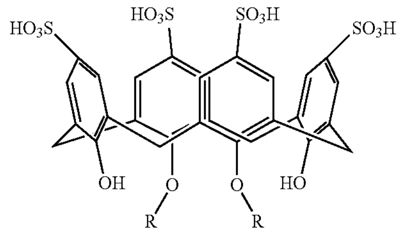

calix mono-1

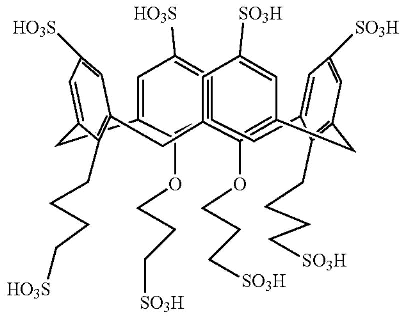 [SMILES: O=S(=O)(O)CCCCc1c2cc(S(=O)(=O)O)cc1Cc1cc(S(=O)(=O)O)cc(c1OCCCS(=O)(=O)O)Cc1cc(S(=O)(=O)O)cc(c1CCCCS(=O)(=O)O)Cc1cc(S(=O)(=O)O)cc(c1OCCCS(=O)(=O)O)C2]

calix mono-2b

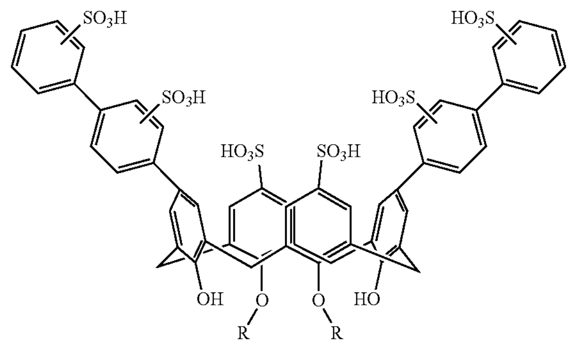

calix mono-3

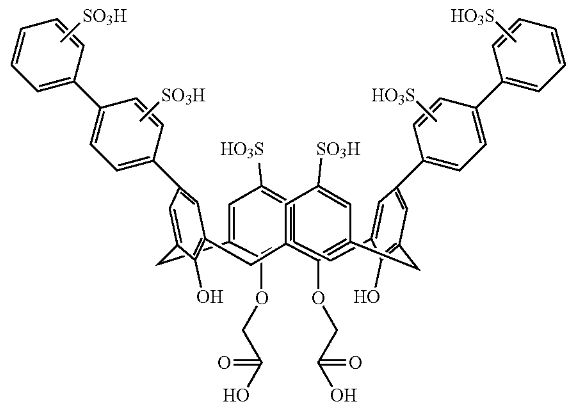

calix mono-4

-continued

Scheme 5.

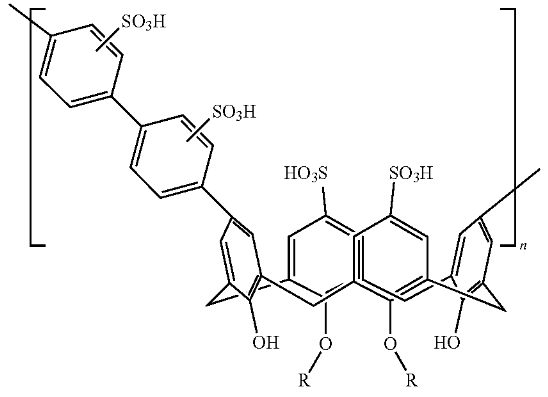

calix-2 (oligomer or polymer)

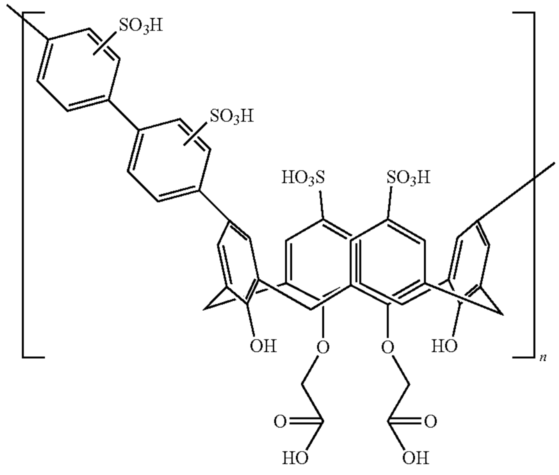

calix-3 (oligomer or polymer)

| R= | m= |
| --- | --- |
| H | N/A |
|  | 0 to n |
| 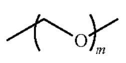 | 0 to n |

Scheme 6 illustrates a non-limiting example of one method which may be used to prepare embodiments of the disclosure having bis-imide backbone polymer chain and a crown ether macrocycle. Variations of the crown ether (crown-6, crown-8, crown-12) can lead to various diameters of ion channels/cavities. Generally, the number of repeat units (n) may be up to 20.

Scheme 6.

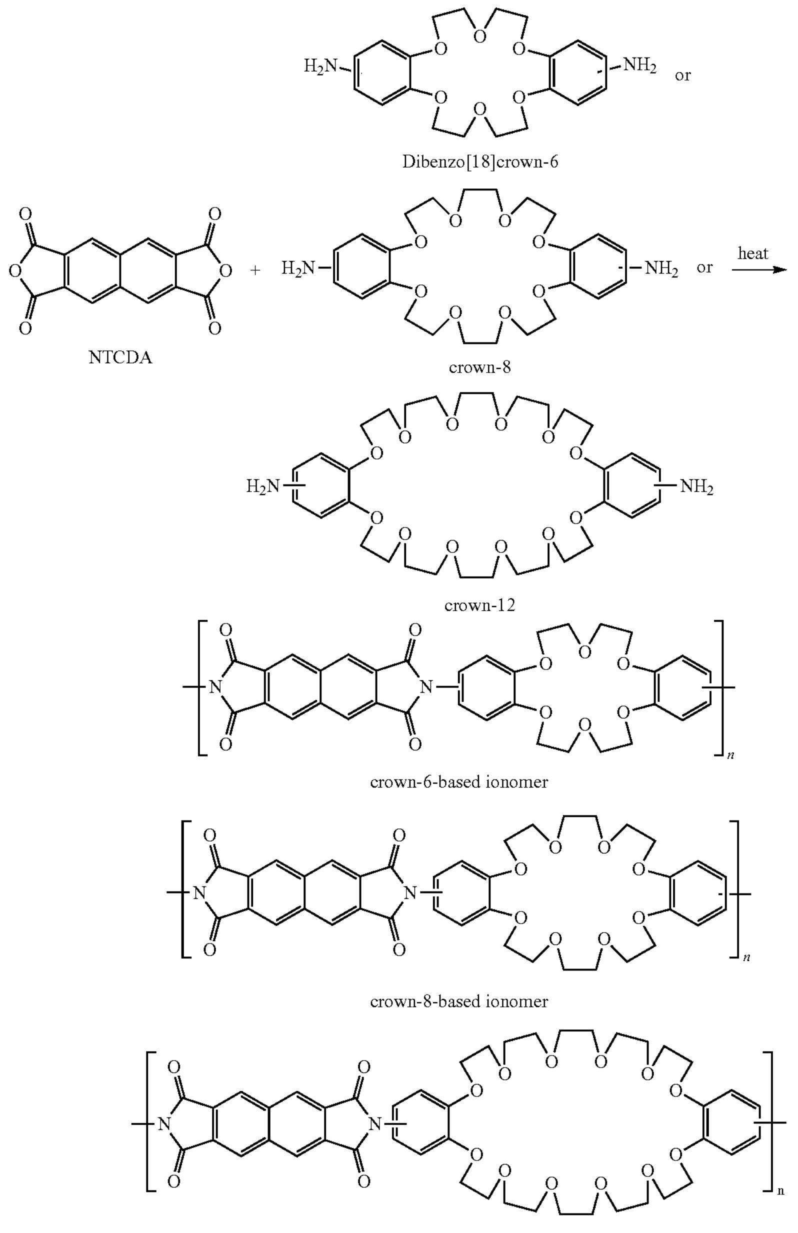

Dibenzo[18]crown-6 or

NTCDA crown-8 or crown-12 crown-6-based ionomer crown-8-based ionomer crown-12-based ionomer

V. Methods of Use and Applications

In some embodiments, the ion conducting materials as disclosed herein are configured for use in energy conversion devices, energy storage devices, other thin electrochemical devices, or water purification devices. By "configured for use" is generally meant that the ion conducting material is provided in the form of a thin film (i.e., a thin layer over catalyst particles on electrodes or a substrate), a bulk membrane, or both. In some embodiments, such membranes and catalyst binder layer comprise the ion conducting material, and may further comprise other components, such as additional polymeric materials. In some embodiments, such membranes consist of the ion conducting material. In some embodiments, the ion conducting material is in the form of a thin film, for example, a sub-micron thick layer having a thickness of from about 2 to about 30 nm (Pt-based catalysts) or more (potentially for low-platinum group metal (low-PGM) and PGM-free catalysts, which can have thicker layers). In some embodiments, the ion conducting material is in the form of a bulk membrane, for example, a membrane having a thickness of from about 10 to about 100 μm. Membranes/catalyst binder layers comprising the ion conducting materials as disclosed herein may be useful for, as non-limiting examples, membrane separators and catalyst binders for hydrogen fuel cells, direct methanol fuel cells, redox flow batteries, and alkali metal ion batteries. Such membranes may also be useful for, as non-limiting examples, separation membranes for e.g., water desalination, nanofiltration, or ultrafiltration of water or separation and purification of other materials.

In membrane form, the ion conducting materials as disclosed herein may be operative to conduct ions in a number of different manners, and which may be tuned according to the desired application. For example, in some embodiments, the ion conducting material as disclosed herein may be present in the membrane as a plurality of individual molecules with their respective macrocycles each behaving as ion conducting pores. Generally, the diameter of such pores is from about 3 to about 12 Å. Ions (e.g., protons) are conducted through these pores by virtue of the ion conducting groups attached to the macrocycles. The conduction through the ion conducting pathways may be controlled by tuning the molecular structure of the functional groups on both rims of the macrocycle and/or choosing different types of macrocycles. In some embodiments, electrochemical potential gradient and pH-dependent gating can be created by creating differential charge distribution across macrocycles using appropriate charged groups at different rims of the macrocycle, as described herein above. In some embodiments, gating behavior may be achieved by controlling the diameter of the macrocycle, charge distribution across the macrocycles, the hydrogen bonding opportunities, and other features of the ion conducting materials as described herein above. In some embodiments, gating materials as disclosed herein may be responsive to stimuli, such as pH, and show pH-dependent ion conduction behavior. In some embodiments, gating materials as disclosed herein exhibit proton conductivity at highly acidic pH that may prevent proton accumulation under confinement, and may minimize the ion transport limitations and ionomer-catalyst interfaces on electrodes of energy conversion devices. In some embodiments, the gating materials as disclosed herein may provide selective transport of ions through the membrane, which behavior may be useful in separation applications or electrochemical devices. Gated or non-gated materials made of ionomers consisting of appropriately chosen diameter of macrocycles as disclosed herein may potentially prevent selective permeation of certain larger ions over smaller ones (such as protons). This can be beneficial for many energy storage devices (such as metal ion batteries, metal sulfide batteries, redox flow batteries).

In some embodiments, at least a portion of the ion conducting material as disclosed herein is present in the membrane or thin film in self-assembled form (e.g., spiral, barrel, ellipsoid, and/or other stacked configurations). In such configurations, ion conduction may proceed through pores of the individual macrocycles as well as through larger channels created through the self-assembly.

Certain embodiments are now described with reference to the following examples. Before describing several exemplary embodiments, it is to be understood that the disclosure is not limited to the details of construction or process steps set forth in the following description. The technology is capable of other embodiments and of being practiced or being carried out in various ways.

EXAMPLES

Several ionomers of the disclosure (calix-1a, calix-2, and PS-calix-1) were prepared as described herein below.

Example 1. Synthesis of Calix-1a Ionomer

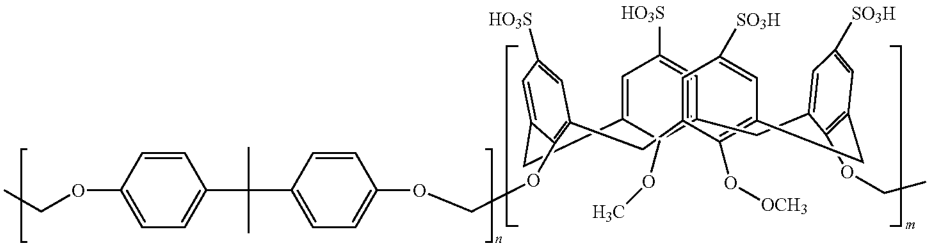

Example 1A. 25, 26, 27, 28-tetrahydrocalix[4]arene (calix[4]arene) (2)

To a solution of p-tert-butylcalix[4]arene (1, 5.0 gm, 7.70 mmol), phenol crystals (2.17 g, 23.05 mmol), and anhydrous aluminum chloride (3.081 g, 23.10 mmol) in 100 mL of toluene were added. The solution was stirred for 4 h. After the completion of reaction, the reaction mixture was poured into water containing ice. The organic phase was extracted using dichloromethane (DCM) (250 mL). The organic layer was washed with 2M HCl (100 mL). The solvent was evaporated under reduced pressure (using rotary evaporator). The residue was dissolved in diethyl ether (25 mL). The temperature of the solution was gradually increased from 0-50° C. overnight (to achieve crystals), filtered, and, dried to collect white crystals of 2 (3 g, 92% yield). Chemical formula: $C_{28}H_{24}O_4$ (Mw 424.17); m.p. 311-313° C. $^1H$ NMR (400 MHz, $CDCl_3$): δ=3.87 (br, 4H, 1H from each —$CH_2$— of 4 ArCH2Ar); 4.38 (br, 4H, 1H from each —$CH_2$— of 4 ArCH2Ar); 6.65 (4H, ArH (para)); 6.82 (8H, ArH (meta)); 10.20 (s, 4H, —OH). HRMS, m/z: 424.17, 425.17, 426.17.

Example 1B. 25, 27-bis(1-methoxy)calix[4]arene (3)

To a suspension ofcalix[4]arene (2, 4.625 g, 10.90 mmol) in acetonitrile ($CH_3CN$, 100 mL), anhydrous potassium carbonate (3.01 g, 21.78 mmol) and 1-iodomethane (6.18 g, 36.355 mmol) were added under nitrogen atmosphere. The reaction mixture was stirred under reflux for 24 h. The solvent was then removed under reduced pressure and the residue was quenched with 10 wt % HCl (100 mL). The residue was extracted using DCM (100 mL). The organic phase was washed twice with distilled water, dried over magnesium sulfate and distilled off to afford solid. The solid was recrystallized from DCM-methanol (1:5) to give pure white solid of 3 (3.64 g, 74% yield). Chemical formula: $C_{30}H_{28}O_4$ (MW 452); m.p. 305-307° C. $^1$H NMR (400 MHz, $CDCl_3$): δ=3.40 (4H, 1H from each —$CH_2$— of 4 Ar—$CH_2$—Ar); 3.98 (s, 6H, —OCH3); 4.30 (4H, 1H from each —$CH_2$— of 4 Ar—$CH_2$—Ar); 6.65-6.73 (t, J=6.70 Hz, 4H, ArH (para)); 6.86 (d, J=7.6 Hz, 4H, ArH (meta)); 7.07 (d, J=7.4 Hz, 4H, ArH (meta)); 7.75 (s, 2H, —OH). HRMS, m/z: 452.20, 453.20, 454.21.

Example 1C. Calixn-1a

A mixture of dimethoxycalix[4]arene (3, 0.5 g, 1.10 mmol), bisphenol-A (4, 0.25 gm 1.10 mmol), dry tetrahydrofuran (THF, 10 mL), and sodium hydride (60% suspension in oil, 0.113 g, 1.833 mmol) was vigorously stirred under nitrogen atmosphere for 40 min at room temperature. The solvent was removed under reduced pressure. To the residue, dry toluene (20 mL), tetrabutylammonium hydrogen sulfate (0.606 g, 1.78 mmol), and dibromomethane (0.71 g, 3.78 mmol) were added. The mixture was stirred under nitrogen atmosphere at 60° C. for 16 h. Then 10:1 (v/v) methanol-acetic acid solution (250 mL) was added to precipitate the polymer. The precipitate was collected by filtration and dried under vacuum overnight to afford calixn-1a as a white solid (0.18 g, 48.35% yield). Molecular weight (Mn 10,690; Mw 29,350; Mz 94,645; PDI 2.74). $^1$H NMR (400 MHz, $CDCl_3$): δ=1.62 (s, 6H, —$CH_3$ between benzene rings of noncalixarene based block); 3.10-4.51 (m, 14H, 6H from 2-$OCH_3$ and 8H from 4-$CH_2$— of 4Ar—$CH_2$—Ar); 5.54-5.65 (4H, 2H from each —$CH_2$— of 2-O—$CH_2$—O—); 6.30-7.18 (20H, 12H from meta-para ArH of calix[4] arene unit+8H from other benzene ring (non-calix[4]arene) based block). Elemental analysis: C, 54.39%; H, 4.42%; O, 21.66%.

Example 1D. Calix-1a

Calixn-1a (0.5 g, 1.477 mmol based on repeat units) was charged to a round-bottom flask equipped with a dropping funnel. Dry DCM (15 mL) was added into the flask. The mixture was cooled to −20° C. To the mixture, chlorosulfonic acid ($C_1SO_3H$, 1.2 mL) in DCM (10 mL) at −20° C. The mixture was stirred at this temperature for 30 min. After the reaction, the mixture was poured into hexane. The resulting polymer was washed with water, dried under vacuum at 60° C. for 10 h to obtain brown sulfonated polymer Calix-1a (0.123 g, 22% yield). Elemental analysis: C, 32.46%; H, 5.51%; O, 43.30%; S, 12.03%. Ratio of m:n=1:1. Molecular weight (approximated at the highest IEC): Mn, 20,793; Mw 56,972; PDI 2.74.

Example 2. Synthesis of Calix-2 calix-2

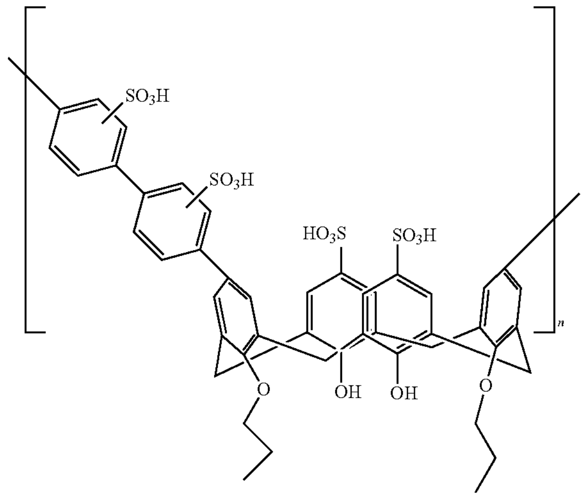

Example 2A. 25,27-bis(1-propoxy) Calix[4]arene (5)

To a suspension of calix[4]arene (2, 9.43 g, 22.23 mmol) in acetonitrile ($CH_3CN$, 200 mL), anhydrous potassium carbonate (6.23 g, 45.08 mmol) and 1-iodopropane (15.11 g, 88.88 mmol) were added under nitrogen atmosphere. The reaction mixture was stirred under reflux for 24 h. The solvent was then removed under reduced pressure and the residue was quenched with 10 wt % HCl (100 mL). The organic phase was extracted using DCM (100 mL), washed twice with distilled water (2×100 mL), dried over magnesium sulfate and distilled off to afford solid. The solid was recrystallized from DCM-methanol (1:5) to give pure white solid 5 (7.90 g, 70% yield). Chemical formula: $C_{34}H_{36}O_4$ (Mw 508); m.p. 268-270° C. 1H NMR (400 MHz, $CDCl_3$): δ=1.33 (t, 6H, from —$CH_3$ of 2-O—$CH_2$—$CH_2$—$CH_3$); 2.09 (m, 4H from —$CH_2$— of 2-O—$CH_2$—$CH_2$—$CH_3$); 3.39 (t, 4H from —$CH_2$— of 2-O—$CH_2$—$CH_2$—$CH_3$); 4.0 (d, 4H; 1H from each —$CH_2$— of Ar—$CH_2$—Ar); 4.34 (d, 4H; 1H from each —$CH_2$— of Ar—$CH_2$—Ar); 6.67 (t, 2H, ArH (para); 6.76 (t, 2H, ArH (para); 6.93 (m, 4H, ArH (meta)); 7.07 (m, 4H, ArH (meta)); 8.32 (s, 2H, —OH). HR MAS, m/z: 508.26, 509.26, 510.27.

Example 2B. 5,17-Dibromo-25,27-dihydroxy-26,28-dipropoxy-calix[4]arene (6)

To a cooled (0° C.), stirred solution of 25,27-bis(1-propoxy) calix[4]arene (5, 1.00 g, 1.97 mmol) in anhydrous chloroform (40 mL), a solution of bromine ($Br_2$, 0.2 mL, 3.94 mmol) in anhydrous chloroform (40 mL) was added during 20 min. The solution was stirred at 0° C. for 1 h; at room temperature for 1 h, and, then concentrated to give the product 6 (0.298 g, 25% yield) as a white solid. Chemical formula: C34H34Br2O4 (Mw 665.8); m.p. 372° C. 1H NMR (400 MHz, $CDCl_3$): δ=1.29 (t, 6H, from —$CH_3$ of 2-O—$CH_2$—$CH_2$—$CH_3$); 2.06 (m, 4H from —$CH_2$— of 2-O—$CH_2$—$CH_2$—$CH_3$); 3.32 (t, 4H from —$CH_2$— of 2-O—$CH_2$—$CH_2$—$CH_3$); 3.95 (d, 4H, 1H from each —$CH_2$— of Ar—$CH_2$—Ar); 4.25 (d, 4H, 1H from each —$CH_2$— of Ar—$CH_2$—Ar); 6.81 (t, 2H, ArH (para)); 6.93 (d, 4H, ArH (meta)); 7.17 (s, 4H, ArH (meta)). HRMS, m/z: 664.08, 665.09, 667.08, 668.08.

Example 2C. Calixn-2

A mixture of 5,17-dibromo-25,27-dihydroxy-26,28-dipropoxy-calix[4]arene (6, 2.6 g, 3.91 mmol), 1,4-biphenylene bis(boronic acid) (0.943 g, 3.90 mmol), tertrakis (triphenylphsophine)palladium(0) (68 mg), anhydrous toluene (5 mL) and anhydrous methanol (0.5 mL) was stirred at 100° C. for 15 min and then treated with potassium carbonate (2M, 4 mL). The suspension was stirred at 100° C. for 5 days, cooled to room temperature with $CH_2Cl_2$ (10 mL) and subsequently washed with water (10 mL) and HCl (1M, 10 mL). The organic layer was dried using sodium sulfate and concentrated to give Calixn-2 (1.16 g, 45% yield). Molecular weight (Mn 7,495; Mw 18,430; Mz 68,475; PDI 2.45). $^1$H NMR (400 MHz, $CDCl_3$): δ=1.29 (t, 6H, from —$CH_3$ of 2-O—$CH_2$—$CH_2$—$CH_3$); 2.06 (m, 4H from —$CH_2$— of 2-O—$CH_2$—$CH_2$—$CH_3$); 3.32 (t, 4H from —$CH_2$— of 2-O—$CH_2$—$CH_2$—$CH_3$); 4.06 (d, 4H, 1H from each —$CH_2$— of Ar—$CH_2$—Ar); 4.25 (d, 4H, 1H from each —$CH_2$— of Ar—$CH_2$—Ar); 6.64-7.43 (18H, 10H from calix[4]arene unit+8H from bisphenyl unit); 8.36 (m, 1H, —OH); 8.54 (s, 1H, —OH). Elemental analysis: C, 62.27%; H, 3.30%; O, 13.39%.

Example 2D. Calix-2

To a round-bottom flask equipped with a dropping funnel, 0.5 g of polymer calixn-2 was charged. Dry DCM (10 mL) was added to the flask and the mixture was cooled to −20° C. To the mixture, chlorosulfonic acid ($ClSO_3H$, 2 mL) in dry dichloromethane (10 mL) at −20° C. and the mixture was stirred at this temperature for 30 min. After the reaction, the mixture was poured into hexane. The resulting compound was dried in vacuum at 60° C. for 10 h to give sulfonated polymer calix-2 (0.2 g, 26.85% yield). Elemental analysis: C, 35.63%; H, 4.12%; O, 35.95%; S, 11.51%. Molecular weight (approximated at the highest IEC): Mn, 11,139; Mw 27,292; PDI 2.45.

Example 3. Synthesis of PS-Calix-1

PS-calix-1

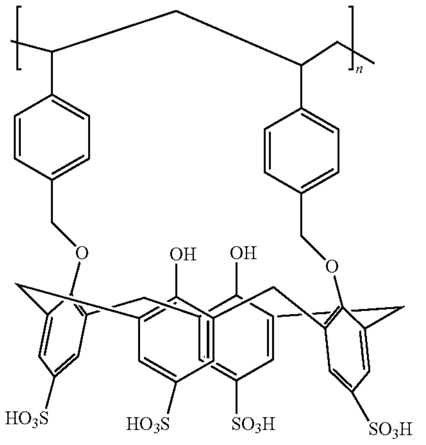

Example 3A. Polymer 8 According to Scheme 3

To a solution of monomer 7 (0.30 g, 0.46 mmol) in THF (instant dried) in a tube (under argon atmosphere), AIBN (0.04 g, 1.0 mol % with respect to monomer 7) was added at room temperature. After sealing the tube, the reaction mixture was degassed by freeze-thaw cycles, and then heated to 70° C. with continuous stirring. After 36 h, the reaction mixture was quenched in an ice bath. Subsequently, the solvent was evaporated. The obtained residue was dissolved in a minimum amount of dichloromethane and precipitated in methanol. This step was repeated thrice or until no free monomer was detectable in the TLC of the samples. The polymers were dried in a vacuum oven at 65° C., overnight to obtain a colourless solid polymer 8 (0.19 g, 59% yield). Molecular weight (Mn 24,500; Mw 47,400; PDI 1.93). n~36. 1H NMR (400 MHz, $CDCl_3$): δ=1.21-2.36 (m, 6H, CH—Ar—$CH_2$) 3.4 (br, 4H, Ar—$CH_2$—Ar (calix)), 4.42 (br, 4H, Ar—$CH_2$—Ar (calix)), 4.88 (br, 4H, Ar—$OCH_2$—Ar), 6.28-7.56 (br, 20H, ArH), 8.31 (s, 2H, Ar—OH).

Example 3B. PS-Calix-1

To a round-bottom flask equipped with a dropping funnel, 0.5 g of polymer (0.73 mmol, based on repeat units) was charged. Dry dichloromethane (5 mL) was added to this flask, and the mixture was cooled down to −20° C. with dry ice. To this mixture, a solution of ClSO3H (0.3 mL, in 2 mL DCM) at −20° C. was added drop wise for 15 min. The mixture was stirred at this temperature for 30 min. After completion of the sulfonation reaction, the mixture was poured into hexane. The resulting compound was washed with water 3 times to remove the excess acid. Finally, the compound was dried in vacuo at 70° C. for 24 h to obtain yellowish ionomer PS-calix-1 (0.12 g, 16.4%). Molecular weight (approximated at the highest IEC): Mn 35,906; Mw 69,298; PDI 1.93. n~36.

Example 4. Synthesis of Calix Mono-2b

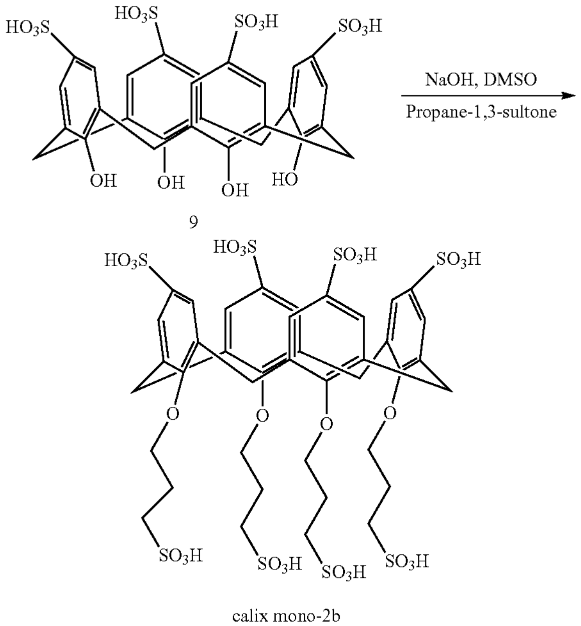

9 calix mono-2b

Para-sulfonato calix[4]arene (9, 0.1 g, 0.13 mmol) was mixed with NaOH (0.107 g, 2.69 mmol) in DMSO (3 mL). Propane-1,3-sultone (0.098 g, 0.80 mmol) was then added dropwise and the mixture was heated at 80° C. for 2 days. DMSO was then distilled out from this reaction mixture under reduced pressure. The obtained orange solid was dissolved in a minimum of water and precipitated from the solution by diluting with ethanol. This operation was repeated many times in order to remove the inorganic salts (created due to reaction between propane-1,3-sultone and NaOH). The obtained precipitate was filtered off, dried under vacuum oven to yield brownish powder calix-mono 2b (0.06 g, 35.8%). Chemical formula: $C_{40}H_{48}O_{28}S_8$ (Mw 1233.28). 1H NMR (400 MHz, $D_2O$): δ=2.45 (m, 8H, $CH_2CH_2O$), 1.85 (t, 8H, $SCH_2$), 3.75 (t, 8H, $OCH_2$), 3.94 (s, 8H, $ArCH_2Ar$), 7.45 (s, 8H, ArH), Example 5. Synthesis of Calix Mono-3

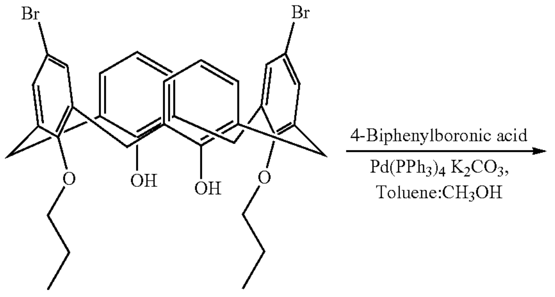

6

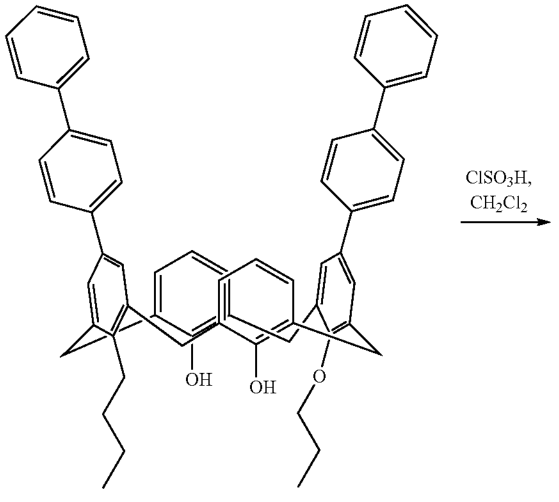

10

-continued

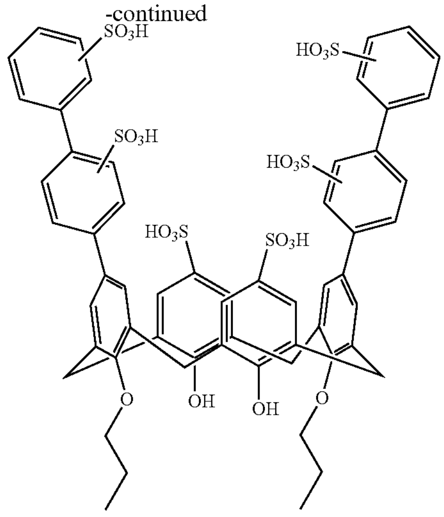

calix mono-3

Example 5A. Synthesis of Compound 10

A mixture of 5,17-dibromo-25,27-dihydroxy-26,28-dipropoxy-calix[4]arene (6, 0.1 g, 0.15 mmol), 4-biphenyl (boronic acid) (0.06 g, 0.31 mmol), tertrakis(triphenylphsophine) palladium(0) (5 mg), anhydrous toluene (5 mL), and anhydrous methanol (1 mL) were stirred at 100° C. for 15 min and then treated with potassium carbonate (2M, 2 mL). The suspension was stirred at 100° C. for 5 days. After cooling the suspension down to room temperature, $CH_2C_{12}$ (10 mL) was added to it and stirred for another 2 h at room temperature. Once this step is complete, the suspension was washed with water (5 mL) and HCl (1 M, 5 mL) subsequently. The organic layer was dried using sodium sulfate and concentrated to give compound 10 (0.09 g, 73.8%). Chemical formula: $C_{58}H_{52}O_4$(Mw 812.24). 1H NMR (400 MHz, $CDCl_3$): 1.38 (m, 6H, from —$CH_3$ of 2-O—$CH_2$—$CH_2$—$CH_3$); 2.16 (m, 4H from —$CH_2$— of 2-O—$CH_2$—$CH_2$—$CH_3$); 3.54 (d, 4H from —$CH_2$— of 2-O—$CH_2$—$CH_2$—$CH_3$); 3.9 (d, 4H, 1H from each —$CH_2$— of Ar—$CH_2$—Ar); 4.25 (d, 4H, 1H from each —$CH_2$— of Ar—$CH_2$—Ar); 7.04-7.03 (d, 2H, Ar), 7.4-7.35 (m, 6H, Ar), 7.50-7.44 (m, 6H, Ar) 7.67-7.62 (m, 14H, Ar) 8.54 (s, 2H, —OH).

Example 5B. Calix Mono-3

To a round-bottomed flask equipped with a dropping funnel, 0.3 g (0.37 mmol) of compound 10 was charged. Dry dichloromethane (10 mL) was then added into the flask, and the mixture was cooled down to −20° C. with dry ice. To this mixture, a solution of ClSO3H (0.5 mL, in 2 mL DCM) at −20° C. was added dropwise for 15 min and the mixture was stirred at this temperature for 30 min. After completion of sulfonation reaction, the mixture was poured into hexane. The resulting compound was washed with water thrice to remove the excess acid. Finally, the compound calix mono-3 was dried in vacuo at 60° C. for 10 h to yield brown solid (0.12 g, 25.4%). Chemical formula: $C_{58}H_{58}O_{22}S_6$ (Mw 1,298).

Example 6. Proton Conductivity

Figure 6A:
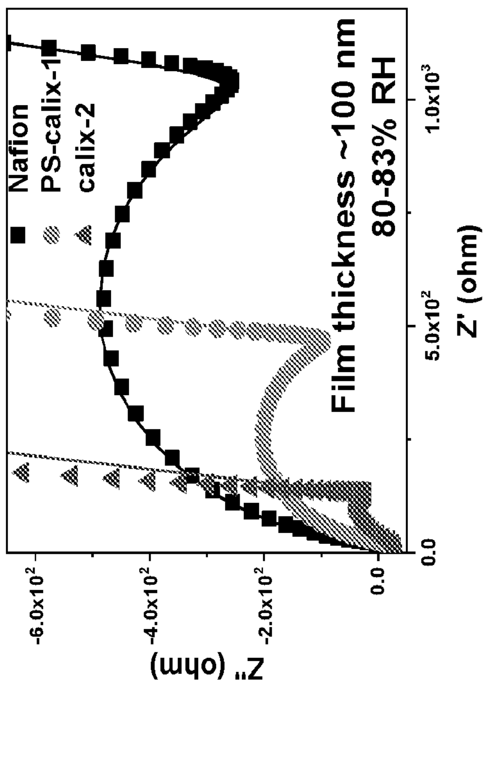
FIG. 6A is a plot of electrochemical impedance spectroscopy (EIS) data illustrating proton conductivity values for embodiments of the disclosure.

A reference sample (Nafion film) and two embodiments of the disclosure (calix-2, PS-calix-1) were evaluated by electrochemical impedance spectroscopy (EIS) to obtain proton conductivity values (FIG. 6A). The ionomer calix-2 has sulfonic acid (—$SO_3H$) groups at the upper rim and hydroxyl (—OH) and propoxy (—$OC_3H_7$) groups at the lower rim. In addition, the non-macrocyclic repeat unit (biphenyl) of calix-2 also bears sulfonic acid (—$SO_3H$) groups. On the other hand, the ionomer PS-calix-1 has sulfonated calix[4]arene units as pendants of polystyrene-based backbone. Without wishing to be bound by theory, such macrocyclic units with ion conducting functionalities are believed to create ion conducting pathways where water molecules behave like one-dimensional water wire, and facilitate ion conduction even in sub-micron thick films. Without wishing to be bound by theory, such functionalities are also believed to provide a difference in charged states at the ends of the cavities, giving gating characteristics to the calix[4]arene-based ionomers.

The negative value of imaginary part of impedance (−Z") was plotted as a function of real part of impedance (Z') (FIG. 6A) obtained from EIS measurements. In an impedance curve, the larger the diameter of the semicircular part, the higher the film resistance is, and the lower the ion conductivity of the film is, in general. Fitting the impedance curve using an equivalent circuit model gave quantitative values of proton conductivity for spin-coated calix-2, PS-calix-1, and Nafion films on gold interdigitated electrodes. Ion conductivity of ~100 nm thick PS-calix-1 film (~15.60 mS/cm) was ~2 times higher than that of the reference Nafion film (~8.30 mS/cm) at ~75% RH. Calix-2 showed even lower film resistance and much higher proton conductivity (~65.50 mS/cm) over PS-calix-1 and Nafion. Some embodiments of this disclosure offered improved ion conductivity as compared to reference ionomer Nafion even at low reactive humidity conditions (<25% RH) and low film thicknesses (<50 nm). For example, a representative ionomer (calix-2) offered an ion conductivity of ~$1\times10^{-2}$ mS/cm at ~25% RH in a film with thickness of ~20 nm. This conductivity was about two orders of magnitude higher than that for a Nafion film with similar thickness and relative humidity condition. Without wishing to be bound by theory, this result suggests that macrocyclic ion conducting cavity, gating, and self-assembly behavior can modulate proton conduction individually, and in a synergistic manner.

Example 7. Proton Conductivity—Gating Behavior

Figure 6B:
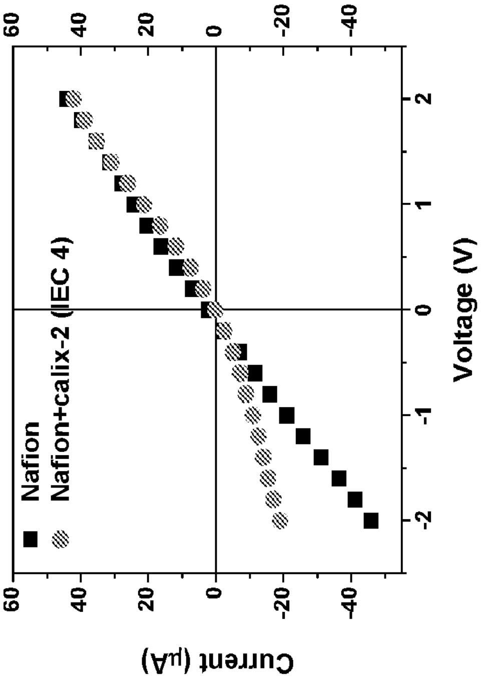
FIG. 6B is a current-voltage plot of a composite membrane containing an embodiment of the disclosure.

The ion transport within sub-nm channels of calix-2 in Nafion-calix-2 composite membranes was investigated by assembling the membrane into an electrochemical device coupled with a pair of Ag/AgCl electrodes at both sides of the membrane. The ionic current through these membranes was measured by forward and reverse biasing with 2 V. The ratio of ionic current obtained from forward and reverse biasing with the same magnitude of voltage gives the ionic rectification ratio. The I-V curve of the Nafion-calix-2 membrane, recorded in 0.1 M KCl solution, exhibited a clear ionic rectification effect with a ratio of 2.22 ($|I_{+2V}/I_{-2V}$) (FIG. 6B). This observation indicates that ionomer membrane containing calix[4]arene-based ionomers are sensitive to applied voltage. Without wishing to be bound by theory, such voltage gating behavior may be attributed to the asymmetric charge distribution at the upper and lower rim of calix[4]arene units which drives the ionic current collectively throughout the membrane. For example, in the calix-2 ionomer, there is no sulfonic acid group at the lower rim of the calix[4]arene repeat unit, while at the upper rim, there are 2 sulfonic acid groups. These —$SO_3H$ groups can combine with 2 more sulfonic acid groups of the biphenyl repeat units to create even higher charge distribution asymmetry. Such charge distribution asymmetry, obtained by including macrocycles in the ionomer structure, can selectively allow/block the ionic current or control the direction of ion flow. It is to be noted that in this specific example of composite membrane, no order of the calix-2 ionomers was induced. Therefore, they can be oriented in different directions. Despite this, the observed ionic rectification was a collective response of all the calix-2 ionomers in the membrane. Again without wishing to be bound by theory, this result suggests that the ionic current and directionality of ion transport can thus be more effectively controlled by taking control over the solution and solid-state self-assembly of macrocyclic units as well as the ionomer chains. Such gating or uni-directionality of ionic current may allow ion permselectivity which can be beneficial for many energy conversion and storage devices as well as some water or other purification systems.

Example 8. Deprotonation Ratio

Figure 7B:
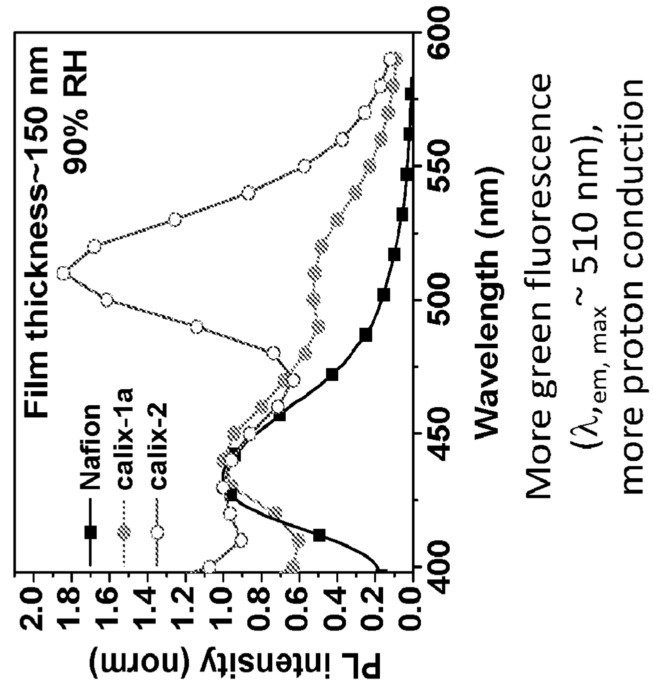
FIG. 7B is a plot of fluorescence intensity as a function of wavelength from steady-state fluorescence spectroscopy for films according to embodiments of the disclosure, incorporating a photoacid probe into the films, and which illustrates the extent of proton conduction within the films.
Figure 7A:
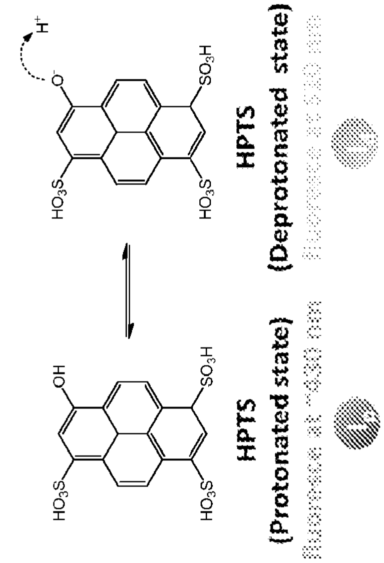
FIG. 7A depicts the protonated and deprotonated states of the fluorescence probe 8-hydroxypyrene-1,3,6-trisulfonic acid (HPTS)
Figure 8:
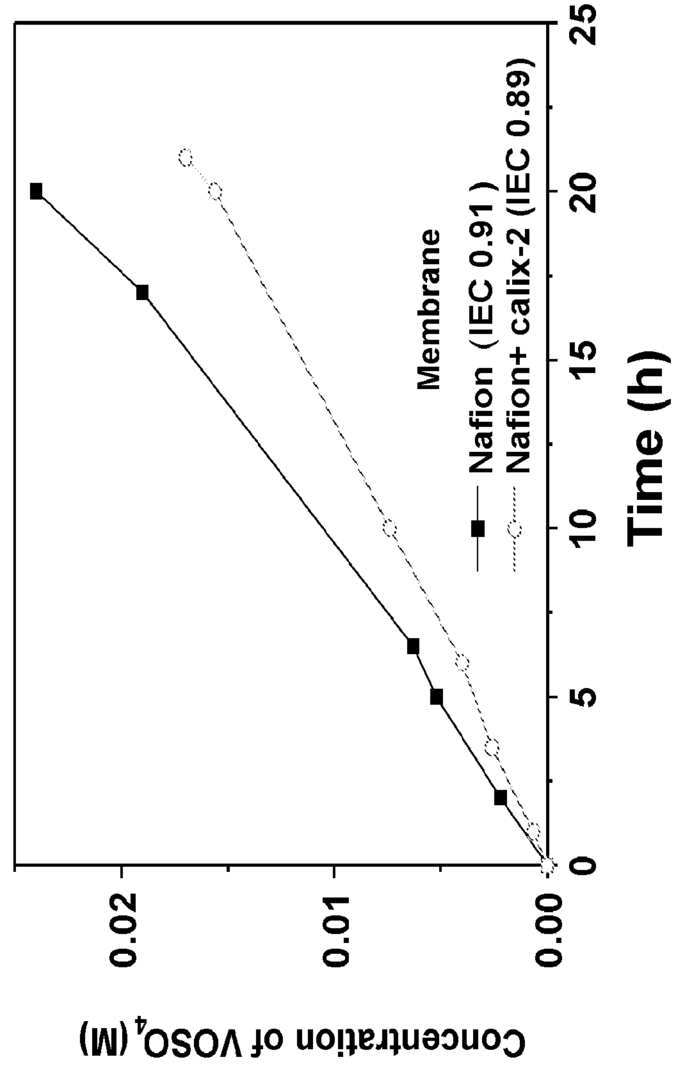
FIG. 8 is a plot of vanadyl sulfate concentration versus time, illustrating membrane permeability of vanadium ions for an embodiment of the disclosure.

The deprotonation ratio $I_d/I_p$), an indirect measure of proton transfer and local proton conduction environment, was obtained by measuring the fluorescence intensity of deprotonated ($I_d$ at ~510 nm) and protonated ($I_p$, at ~430 nm) state of a photoacid probe (HPTS; FIG. 7A) incorporated into ionomer thin films of the disclosure. An increase in the deprotonation ratio ($I_d/I_p$) indicates the increase in the extent of proton transfer. The ionomers containing calix[4]arenes (calix-1a and calix-2) showed $I_d/I_p$ values higher than the reference Nafion in films with similar thickness at 90% RH (FIG. 7B). Thus, the EIS and fluorescence spectroscopy data corroborated with each other and testified to the superior proton conductivity of macrocyclic calix[4]arene based ionomers of the present disclosure, even in sub-micron thick films. Without wishing to be bound by theory, it is believed that the higher proton conductivity of calix-1a and calix-2 may be attributed to one-dimensional water wire formation through the macrocyclic calix[4]arene cavities and the gating functionalities imparted to those.

Example 9. Permeability and Selectivity

Permeability and selectivity of reference (Nafion) and embodiments of the disclosure (Nafion-calix-2 composite) membranes were measured using a glass H-cell (Adams & Chittenden Scientific Glass, Berkeley, CA) following the literature procedure (Kim et al., "Cycling Performance and Efficiency of Sulfonated Poly(Sulfone) Membranes in Vanadium Redox Flow Batteries". Electrochem. Commun. 2010, 12, 1650-1653; Sun et al., "Investigations on Transfer of Water and Vanadium Ions across Nafion Membrane in an Operating Vanadium Redox Flow Battery". J. Power Sources 2010, 195, 890-897).

Vanadyl sulfate (100 mL of 1M $VOSO_4$ in 1.5 M $H_2SO_4$) and 100 mL of 1M MgSO4 in 1.5 M $H_2SO_4$ were placed in opposite compartments of the H-cell. The compartments were separated by the reference Nafion (NR212; IEC 0.91) or embodiment (Nafion-calix-2 composite; $(IEC)_{composite}$~0.89) membranes. The concentration of $VO^{+2}$ in the VW-deficient compartment was measured using a UV/Vis spectrophotometer. The active area of the membrane was 4.87 $cm^2$. The volume of solution in each compartment was 100 $cm^3$ and thickness of pure Nafion (reference) and Nafion-calix-2 composite membranes (embodiments) were 45 μm and 25 μm, respectively. The value of $VO^{+2}$ ion permeability obtained for the reference Nafion membrane ($1.69\times10^{-6}$ $cm^2$/min) was comparable to that reported in the literature (Kim et al Electrochem. Commun. 2010, 12, 1650-1653), while the Nafion-calix-2 composite membrane showed a $VO^{+2}$ permeability ($6.85\times10^{-7}$).

Example 10. X-Ray Diffraction (XRD) Data

Figure 9B:
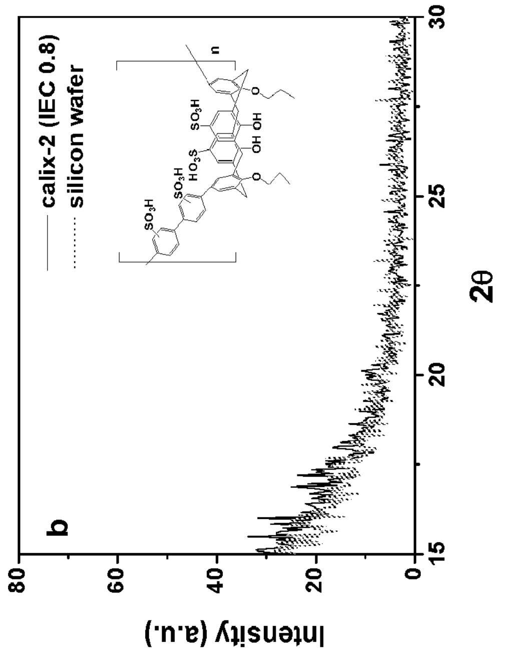
FIG. 9A and FIG. 9B are x-ray diffraction (XRD) profiles for embodiments of the disclosure.
Figure 9A:
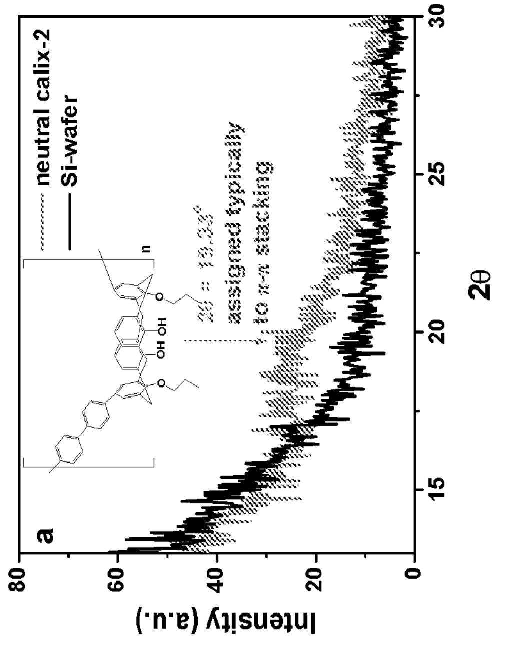

X-ray diffraction (XRD) patterns were obtained for the neutral precursor of calix-2 (calixn-2). In the in-plane scattering of calixn-2 (FIG. 9A), the broad peak observed between 2θ values of 15° and 25° is the characteristic of π-π stacking of aromatic rings based on literature. In the case of neutral calix-2 (structure shown in FIG. 9A), the biphenyl repeat units are likely to contribute to π-π stacking. While the non-sulfonated (neutral) polymer shows π-π stacking, this may not be the case for the sulfonated polymer (ionomer) as there was no peak between 15° and 25° from films of sulfonated ionomer calix-2 irrespective of IECs (FIG. 9B). This likely suggests that the π-π stacking in ionomers may be disrupted upon sulfonation in some structures (not necessarily the case for every sulfonated ionomer in the disclosure). Despite that, macrocycle-based ionomers can self-assemble as can be seen from AFM images (FIGS. 10A-10D and FIGS. 11A to 11F) and can be attributed to other types of hydrophobic and hydrogen-bonding interactions. The interaction modes are included, but not limited to alkyl chain hydrophobic interactions, and/or hydrogen bonding between —OH and other groups at pendants of macrocyclic and non-macrocyclic repeat units.

Example 11. Atomic Force Microscopy (AFM) Data

Figures 10A, 10B, 10C, 10D:
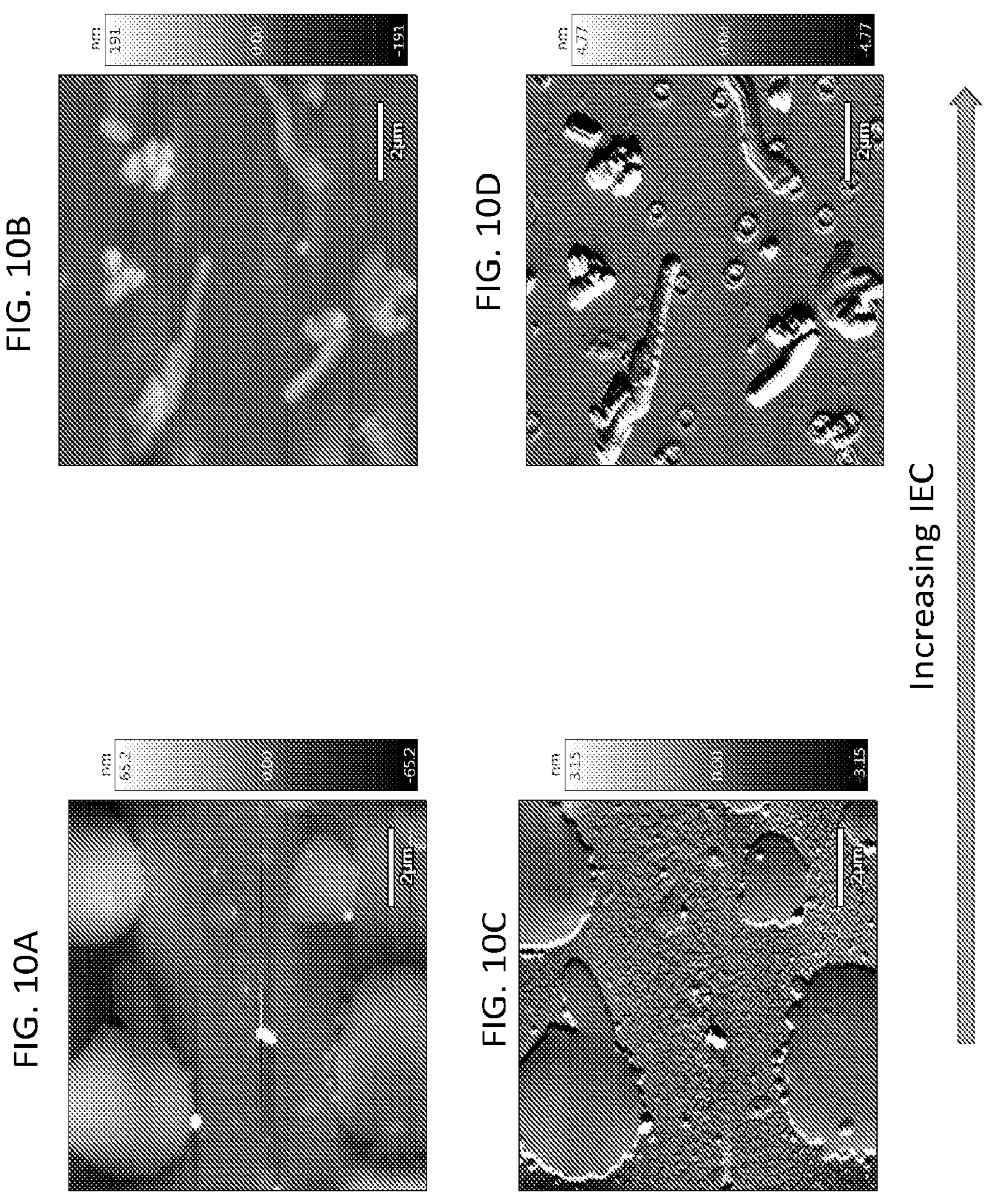
FIGS. 10A, 10B, 10C, and 10D are atomic force microscopy (AFM) images demonstrating formation of spheroid/ellipsoid-like structures (FIG. 10A and FIG. 10C; height and amplitude images, respectively) and cylindrical-like structures (FIG. 10B and FIG. 10D; height and amplitude images, respectively) for embodiments of the disclosure.

Atomic force microscopy (AFM) images (FIGS. 10A-10D and FIGS. 11A-11F) suggested that the morphologies of calix-2 ionomers in thin films are dependent on the IEC and film preparation procedure (including, but not limited to wt % of ionomer and solvent used to make a film, spinning speed, heat treatment method). FIG. 10A and FIG. 10C (height and amplitude images, respectively) and FIG. 10B and FIG. 10D (height and amplitude images, respectively) represent the morphology of ~15 nm thick films (on $SiO_2$ wafer) of calix-2 ionomers as a function of IEC.

Figures 11A, 11B, 11C, 11D, 11E, 11F:
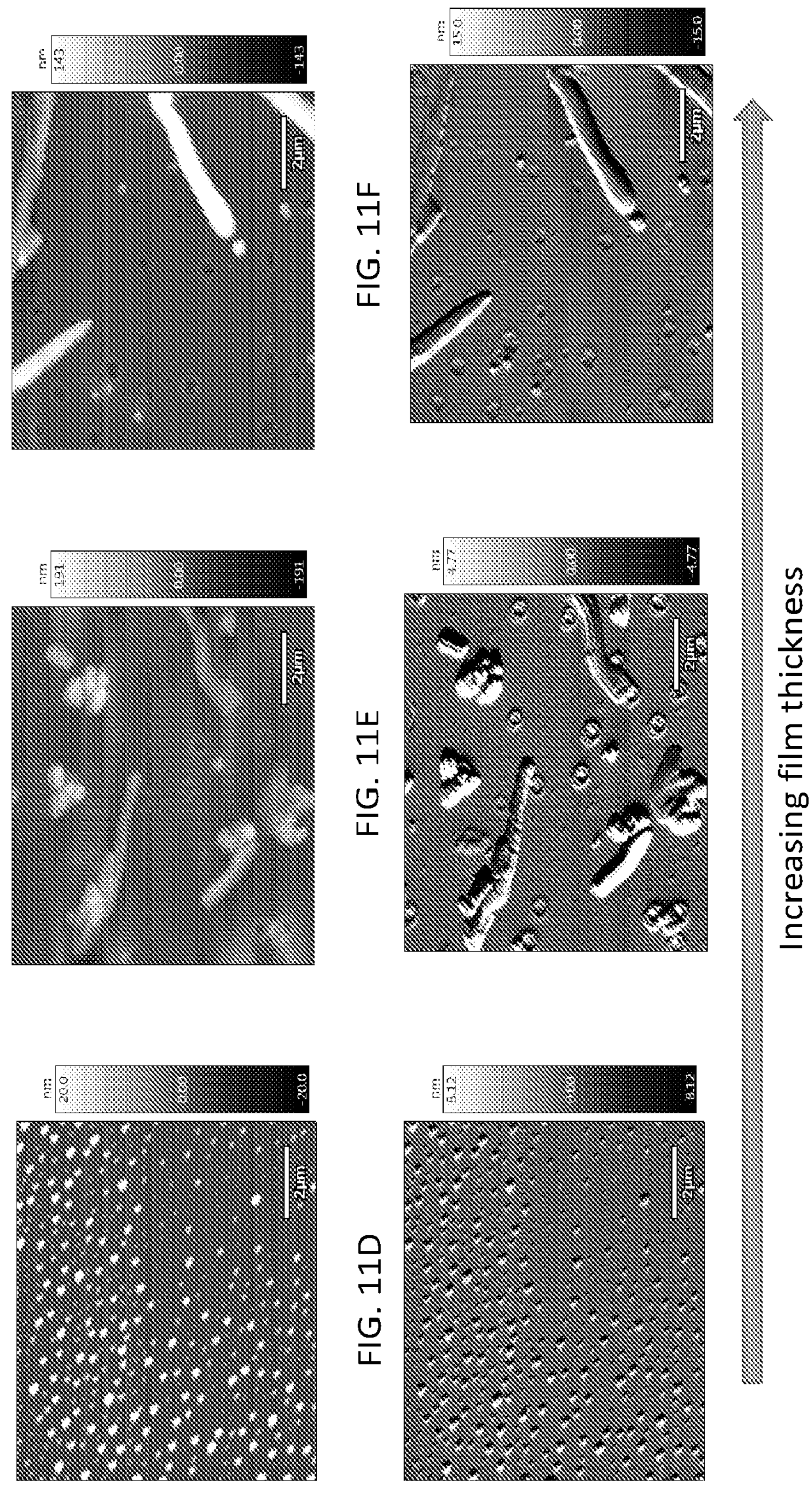
FIGS. 11A, 11B, 11C, 11D, 11E, and 11F are atomic force microscopy (AFM) images demonstrating formation of spheroid/ellipsoid-like (FIG. 11A and FIG. 11D; height images and amplitude images, respectively) and cylindrical-like (FIG. 11B and FIG. 11E, height images and amplitude images, respectively.

FIGS. 11A-11F, on the other hand, showed the morphological transition with the gradual increase in film thickness of a calix-2 ionomer. The thickness of these films shown in FIGS. 11A-11F were ~2 nm (FIGS. 11A and 11D; height an amplitude images, respectively), ~20 nm (FIGS. 11B and 11E; height an amplitude images, respectively) and ~36 nm (FIGS. 11C and 11F; height an amplitude images, respectively). At low IEC (FIGS. 10A and 10C) and ultra-low thickness (<15 nm thick; FIGS. 11A and 11D), calix-2 ionomers tended to form more spheroid/ellipsoid like self-assembled structures. On the other hand, relatively thicker films and films of ionomers with high IEC showed cylindrical channel-like formation (FIGS. 10B and 10D; FIGS. 11B/11E, and 11C/11F). These results indicate that embodiments of the disclosure can have spheroidal/ellipsoidal/cylindrical self-assembled structures in sub-micron thick films where connected ion conduction pathways may exist.

Example 12. Grazing Incidence Small Angle X-Ray Scattering (GISAXS) Data

Figure 12:
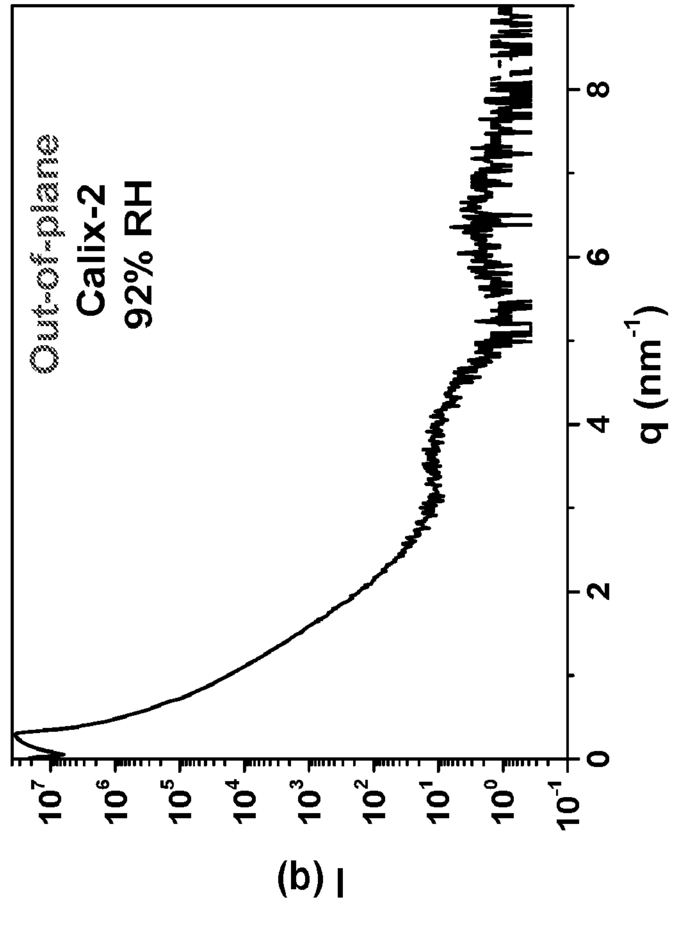
FIG. 12 is a grazing incidence small-angle x-ray scattering (GISAXS) plot of an embodiment of the disclosure.

While there was no in-plane scattering, calix-2 ionomer films showed two ionic domain peaks at 4.02 nm-1 (d-spacing=1.56 nm and 6.46 nm-1 (d-spacing=0.97 nm) at the out-of-plane direction in GISAXS profile (FIG. 12). The d-spacing ~1.56 nm for the first scattering peak could be attributed to the ionic domains through the macrocyclic cavities of calix[4]arene repeat units as the theoretically calculated distance between two macrocyclic repeat units spaced by a biphenyl unit in a calix-2 chain is ~1.56 nm. This suggests that the calix[4]arene units in the representative macrocycle-based ionomers in the disclosure are likely to create/act like ionic domains. Together, the GISAXS and AFM evidence suggest that calix-2 is likely to perform ion conduction through pathways with two different length scales (i.e., through the single calix[4]arene units (based on GISAXS), and the other through a self-assembled tunnel-like pathway with larger diameter (based on AFM data)). These data also indicate the existence of self-assembled ion conduction pathways (e.g. barrel-rosette) in films of a macrocycle based ionomer of the disclosure.

What is claimed is:

1. An ion conducting material comprising:

one or more macrocyclic repeat units, the macrocyclic repeat units comprising a macrocycle which is a calix[n]arene where n is an integer from about 4 to about 20, a crown ether, a cyclodextrin, or a porphyrin;

a pendant group; and/or optionally one or more backbone repeat units, wherein the pendant group and the one or more backbone repeat units are chemically bonded to the macrocycle to form an ion conduction pathway of the ion conducting material, and wherein the pendant group, the one or more backbone repeat units, or both, comprise an ion conducting functional group to enable movement of ions through the ion conduction pathway of the ion conducting material.

2. The ion conducting material of claim 1, further comprising a macrocycle which is a calix[n]arene where n is an integer from about 4 to about 20.

3. The ion conducting material of claim 1, further comprising a macrocycle which is a dibenzo-x-crown-y ether, wherein x is a multiple of 3, ranging from 12 to 81, and y is x/3.

4. The ion conducting material of claim 3, wherein the dibenzo-x-crown-y ether is one or more of dibenzo-18-crown-6, dibenzo-24-crown-8, and dibenzo-36-crown-12.

5. The ion conducting material of claim 1, further comprising a macrocycle which is a cyclodextrin selected from α-cyclodextrin, β-cyclodextrin, and γ-cyclodextrin.

6. The ion conducting material of claim 1, wherein the pendant group comprises an aliphatic group, and wherein the aliphatic group is alkyl, alkenyl, alkynyl, cycloalkyl, or heterocyclyl, each of which may optionally be substituted with one or more of alkyl, alkenyl, alkynyl, cycloalkyl, heterocycloalkyl, alkaryl, alkyl heteroaryl, amino, ammonium, acyl, acyloxy, acylamino, aminocarbonyl, alkoxycarbonyl, ureido, carbamate, aryl, heteroaryl, sulfinyl, sulfonyl, hydroxyl, alkoxy, sulfanyl, halo, carboxy, trihalomethyl, cyano, hydroxy, mercapto, or nitro.

7. The ion conducting material of claim 1, wherein the pendant group comprises an aliphatic group, and wherein the aliphatic group is alkyl, perfluoroalkyl, or alkyl ether.

8. The ion conducting material of claim 1, wherein the pendant group comprises an aromatic group, and wherein the aromatic group comprises aryl, heteroaryl, or aralkyl, each of which may optionally be substituted with one or more of alkyl, alkenyl, alkynyl, cycloalkyl, heterocycloalkyl, amino, ammonium, acyl, acyloxy, acylamino, aminocarbonyl, alkoxycarbonyl, ureido, carbamate, sulfinyl, sulfonyl, hydroxyl, alkoxy, sulfanyl, halo, carboxy, trihalomethyl, cyano, hydroxy, mercapto, or nitro.

9. The ion conducting material of claim 1, wherein the pendant group comprises an aromatic group, and wherein the aromatic group comprises phenyl, biphenyl, triphenyl, naphthyl, or anthracenyl units.

10. The ion conducting material of claim 1, wherein the pendant group comprises an aromatic group, and wherein the aromatic group comprises bisphenol, biphenyl, triphenyl, styrene, or fluorene, each of which may be optionally substituted with one or more of a sulfone, an ether sulfone, an ether ketone, or an ether ether ketone.

11. The ion conducting material of claim 1, wherein the backbone repeat units comprise an aliphatic group, and wherein the aliphatic group is alkyl, alkenyl, alkynyl, cycloalkyl, or heterocyclyl, each of which may optionally be substituted with one or more of alkyl, alkenyl, alkynyl, cycloalkyl, heterocycloalkyl, aryl, alkaryl, alkyl heteroaryl, amino, ammonium, acyl, acyloxy, acylamino, aminocarbonyl, alkoxycarbonyl, ureido, carbamate, aryl, heteroaryl, sulfinyl, sulfonyl, hydroxyl, alkoxy, sulfanyl, halo, carboxy, trihalomethyl, cyano, hydroxy, mercapto, or nitro.

12. The ion conducting material of claim 1, wherein the backbone repeat units comprise an aliphatic group, and wherein the aliphatic group is alkyl, perfluoroalkyl, or alkyl ether.

13. The ion conducting material of claim 1, wherein the backbone repeat units comprise an aromatic group, and wherein the aromatic group is aryl, heteroaryl, or aralkyl, each of which may optionally be substituted with one or more of alkyl, alkenyl, alkynyl, aryl, cycloalkyl, heterocycloalkyl, amino, ammonium, acyl, acyloxy, acylamino, aminocarbonyl, alkoxycarbonyl, ureido, carbamate, sulfinyl, sulfonyl, hydroxyl, alkoxy, sulfanyl, halo, carboxy, trihalomethyl, cyano, hydroxy, mercapto, or nitro.

14. The ion conducting material of claim 1, wherein the pendant group or backbone repeat units have a structure selected from the group consisting of:

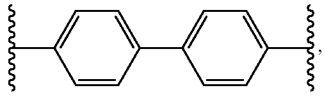,
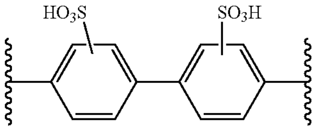,
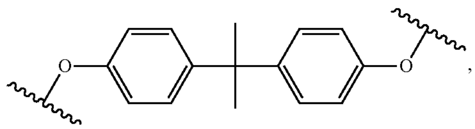,

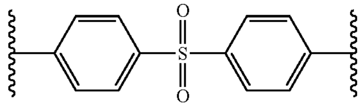,

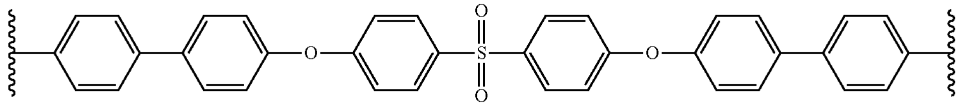,

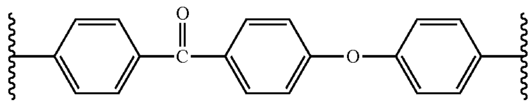,
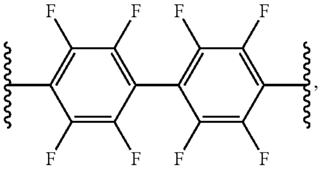,

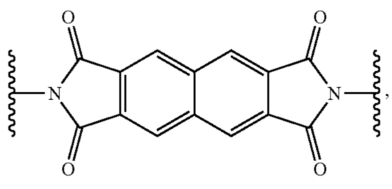,
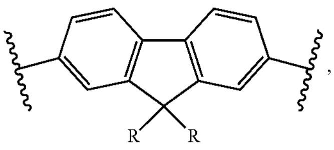,
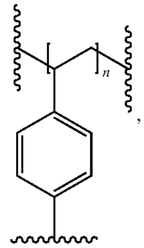,
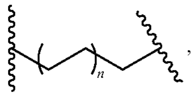,

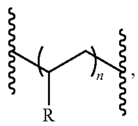, and
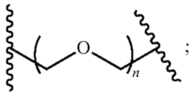;

wherein R is an aliphatic and/or aromatic unit, and n is an integer from 1 to 10.

15. The ion conducting material of claim 1, wherein the macrocycle has a structure selected from the group consisting of:
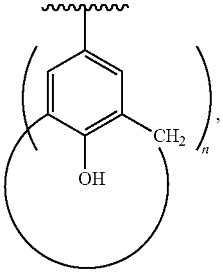
, where n - 4-20,
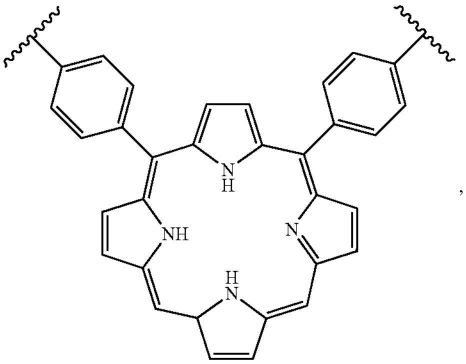
,
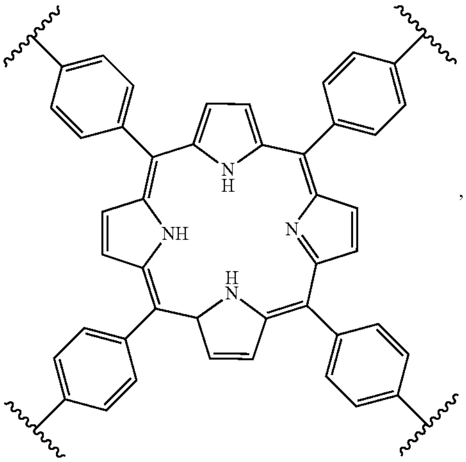
,
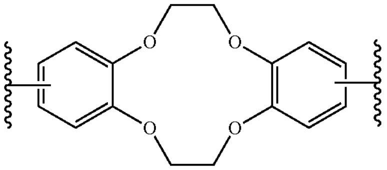
,
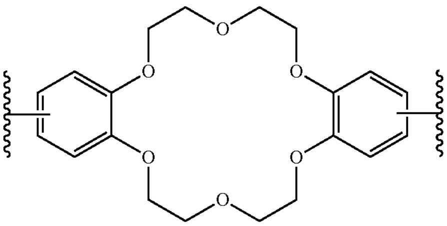
,
-continued
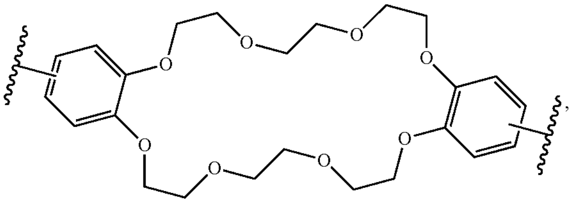
,
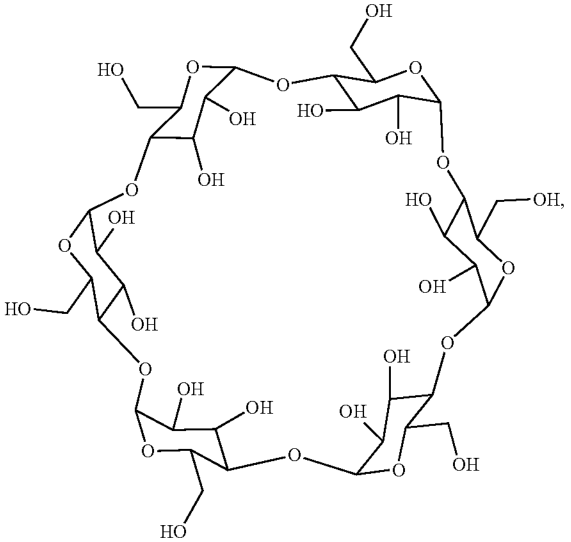
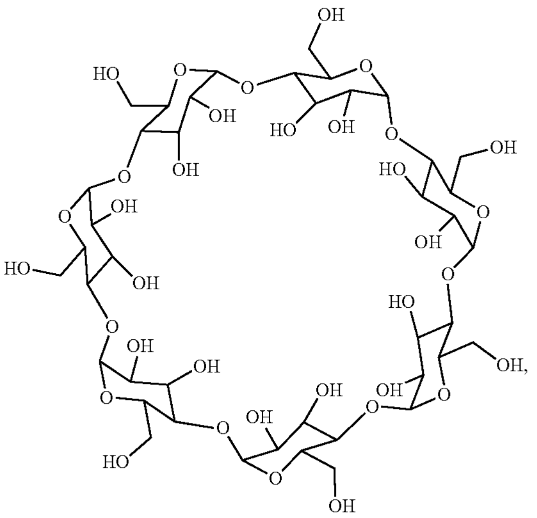
and -continued

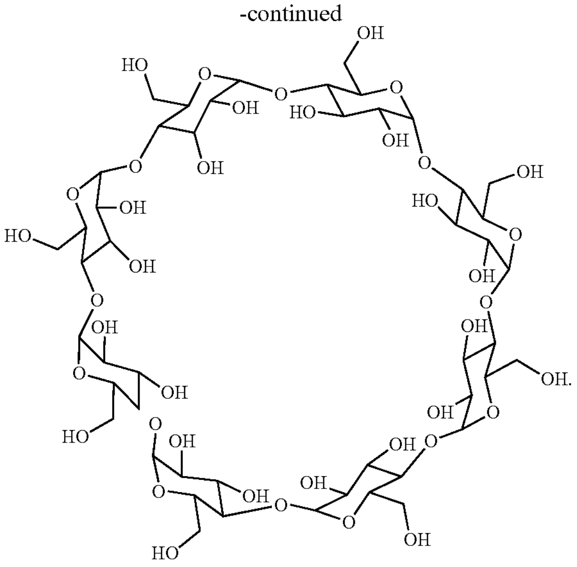

16. The ion conducting material of claim 1, wherein macrocyclic moiety is gated.

17. An ion-conducting membrane comprising the ion conducting material of claim 1.

18. The ion conducting material of claim 1, wherein the ion conducting functional group comprises a sulfonic acid group, a sulfonate group, a quaternary ammonium group, or a phosphate group.

19. The ion conducting material of claim 1, wherein the ion conducting material is a proton conducting material configured to receive water molecules at a first end of the ion conduction pathway of the proton conducting material and to provide protons from a second end of the ion conduction pathway of the proton conducting material.

20. The ion conducting material of claim 1, wherein a sub-micron thick film of the ion conducting material has a proton conductivity of greater than or equal to $1\times10^{-3}$ mS/cm at a relative humidity of 25% or less.

* * * * *